US011535691B2

(12) United States Patent
Harada et al.

(10) Patent No.: US 11,535,691 B2
(45) Date of Patent: Dec. 27, 2022

(54) MACROMOLECULAR MATERIAL, METHOD FOR PRODUCING SAME, AND POLYMERIZABLE MONOMER COMPOSITION

(71) Applicant: Osaka University, Suita (JP)

(72) Inventors: Akira Harada, Suita (JP); Yoshinori Takashima, Suita (JP); Kazuhisa Iwaso, Suita (JP)

(73) Assignee: Osaka University, Suita (JP)

( * ) Notice: Subject to any disclaimer, the term of this patent is extended or adjusted under 35 U.S.C. 154(b) by 579 days.

(21) Appl. No.: 16/086,088

(22) PCT Filed: Feb. 28, 2017

(86) PCT No.: PCT/JP2017/007747
§ 371 (c)(1),
(2) Date: Sep. 18, 2018

(87) PCT Pub. No.: WO2017/159346
PCT Pub. Date: Sep. 21, 2017

(65) Prior Publication Data
US 2022/0169768 A1 Jun. 2, 2022

(30) Foreign Application Priority Data

Mar. 18, 2016 (JP) .............................. JP2016-055123

(51) Int. Cl.
*C08F 220/58* (2006.01)
*C08B 37/00* (2006.01)
(Continued)

(52) U.S. Cl.
CPC ........ *C08F 220/58* (2013.01); *C08B 37/0012* (2013.01); *C08F 2/10* (2013.01)

(58) Field of Classification Search
CPC ....... C08F 220/58; C08F 2/10; C08B 37/0012
(Continued)

(56) References Cited

U.S. PATENT DOCUMENTS

2015/0073091 A1  3/2015  Harada et al.
2016/0272768 A1  9/2016  Harada et al.
(Continued)

FOREIGN PATENT DOCUMENTS

CN   104262643 A   1/2015
CN   105061673 A   11/2015
(Continued)

OTHER PUBLICATIONS

Lima et al. "Free and copolymerized γ-cyclodextrins regulate the performance of dexamethasone-loaded dextran microspheres for bone regeneration", J. Materials Chemistry B, 2014, vol. 2, pp. 4943-4956 (Year: 2014).*
(Continued)

*Primary Examiner* — Michael M. Bernshteyn
(74) *Attorney, Agent, or Firm* — Locke Lord LLP; James E. Armstrong, IV; Nicholas J. DiCeglie, Jr.

(57) ABSTRACT

Provided are a macromolecular material that exhibits high toughness and self-healing properties, and that can be produced by a simple process, as well as a method for producing the material. The macromolecular material contains a crosslinked polymer crosslinked by the interaction between a host group and a guest group. The crosslinked polymer contains a repeating structural unit represented by the following formula (1a) and a repeating structural unit represented by the following formula (2a).

(Continued)

(56) References Cited

U.S. PATENT DOCUMENTS

2017/0233533 A1 8/2017 Harada et al.
2018/0133986 A1 5/2018 Harada et al.

FOREIGN PATENT DOCUMENTS

| EP | 2842976 A1 * | 3/2015 | ............... C08F 2/10 |
|---|---|---|---|
| JP | S52-71583 A | 6/1977 | |
| JP | 03-221502 A | 9/1991 | |
| JP | 08-100027 A | 4/1996 | |
| JP | 09-263560 A | 10/1997 | |
| JP | 2017-071710 A | 4/2017 | |
| JP | 6257633 B2 | 1/2018 | |
| WO | 2013/162019 A1 | 10/2013 | |
| WO | 2016/006413 A1 | 1/2016 | |
| WO | 2016/163550 A1 | 10/2016 | |

OTHER PUBLICATIONS

Lima et al. "Free and copolymerized y-cyclodextrins regulate the performance of dexamethasone-loaded dextran microspheres for bone generation", J. Materials Chemistry B, 2014, vol. 2, pp. 4943-4956. (Year: 2014).*
A.C. Lima et al., "Free and copolymerized gamma-cyclodextrins regulate the performance of dexamethasone-loaded dextran microspheres for bone regeneration", Journal of Materials Chemistry B, vol. 2, 2014, pp. 4943-4956. (cited in the Jun. 12, 2020 Office Action issued for CN201780017993.5).
Office Action dated Jun. 12, 2020, issued for the corresponding CN patent application No. 201780017993.5 and English translation thereof.
Office Action dated Dec. 16, 2020, issued for the corresponding JP patent application No. 2019-227043 and English translation thereof.
International Search Report dated May 30, 2017, issued for PCT/JP2017/007747.

* cited by examiner

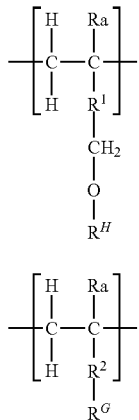

(1a)

(2a)

7 Claims, 24 Drawing Sheets

(51) Int. Cl.
*C08F 2/10* (2006.01)
*C08B 37/16* (2006.01)

(58) Field of Classification Search
USPC ....................................................... 525/54.2
See application file for complete search history.

Linker (7-1-2)

MACROMOLECULAR MATERIAL, METHOD FOR PRODUCING SAME, AND POLYMERIZABLE MONOMER COMPOSITION

TECHNICAL FIELD

The present invention relates to macromolecular materials, methods for producing the materials, and polymerizable monomer compositions.

BACKGROUND ART

Macromolecular materials, such as macromolecular gels, have been an active area of research and development. Due to their characteristics, these materials have a wide range of applications in many fields, including industry, medicine, and food. An example of known macromolecular gels is a "hydrogel," which retains water in its three-dimensional, crosslinked polymer. In particular, approaches to imparting properties such as self-healing properties and shape memory properties to macromolecular gels have been attempted to develop more sophisticated macromolecular gels.

The crosslinked polymer, which is a matrix constituting a macromolecular gel, typically has a three-dimensional network formed by the crosslinkage of polymer chains via covalent bonds. Thus, stress added to a macromolecular gel is likely to be concentrated on short polymers in the three-dimensional network, and the material becomes prone to breaking. Once the bond of a crosslinked portion in the three-dimensional network is cleaved, the bond is never restored (re-bonded), which makes it difficult for the gel to restore itself.

Given the current status of the art, PTL 1, for example, suggests a technique to form a macromolecular gel using host-guest interaction between a polymer having a host group and a polymer having a guest group. Even if such a macromolecular gel is cleaved, the macromolecular gel can be restored due to the re-bonding between polymers in the network through the host-guest interaction. Thus, the macromolecular gel is a material that has an excellent self-healing function and shape memory function.

CITATION LIST

Patent Literature

PTL 1: WO2013/162019

SUMMARY OF INVENTION

Technical Problem

There has been demand for such a macromolecular gel that is also highly tough. A highly tough macromolecular gel becomes a material with great potential for use because such a material would be excellent in material strength and durability, and further expand the applications. Thus, the development of a macromolecular gel that is highly tough while being also self-healable has been a matter of great interest.

The present invention was completed in view of the current status described above. An object of the invention is to provide a macromolecular material that exhibits high toughness while having self-healing properties, and that can be produced by a simple process, and to provide a method for producing the material. Another object is to provide a polymerizable monomer composition that is a starting material suitable for producing the macromolecular material.

Solution to Problem

The present inventors conducted extensive research to achieve the objects, and found that the objects can be achieved by incorporating, in particular, a specifically structured host and guest into the macromolecular skeleton of a macromolecular material to be formed through host-guest interaction. The inventors then completed the invention.

Specifically, the present invention includes, for example, the subject matter described in the following items.

Item 1.

A macromolecular material comprising a crosslinked polymer that is crosslinked by interaction between a host group and a guest group, the crosslinked polymer comprising a repeating structural unit represented by the following formula (1a) and a repeating structural unit represented by the following formula (2a):

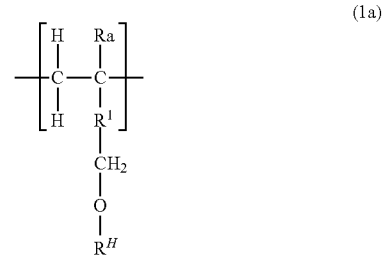

wherein Ra represents hydrogen or methyl, $R^H$ represents the host group, and $R^1$ represents a divalent group formed by removing one hydrogen atom from a monovalent group selected from the group consisting of hydroxyl, thiol, alkoxy optionally having at least one substituent, thioalkoxy optionally having at least one substituent, alkyl optionally having at least one substituent, amino optionally having one substituent, amide optionally having one substituent, aldehyde, and carboxyl; and

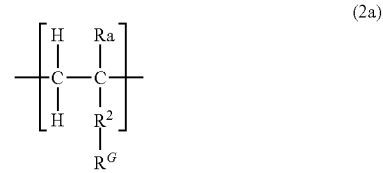

wherein Ra represents hydrogen or methyl, $R^G$ represents the guest group, and $R^2$ represents a divalent group formed by removing one hydrogen atom from a monovalent group selected from the group consisting of hydroxyl, thiol, alkoxy optionally having at least one substituent, thioalkoxy optionally having at least one substituent, alkyl optionally having at least one substituent, amino optionally having one substituent, amide optionally having one substituent, aldehyde, and carboxyl.

Item 2.

The macromolecular material according to Item 1, wherein the host group is at least one member selected from the group consisting of α-cyclodextrin, β-cyclodextrin, and γ-cyclodextrin.

Item 3.

The macromolecular material according to Item 1 or 2, wherein the host group is α-cyclodextrin, and the guest group is at least one member selected from the group consisting of octyl and dodecyl.

Item 4.

The macromolecular material according to Item 1 or 2, wherein the host group is β-cyclodextrin, and the guest group is at least one member selected from the group consisting of adamantyl and isobornyl.

Item 5.

The macromolecular material according to Item 1 or 2, wherein the host group is γ-cyclodextrin, and the guest group is at least one member selected from the group consisting of octyl and dodecyl.

Item 6.

A method for producing a macromolecular material comprising a crosslinked polymer that is crosslinked by interaction between a host group and a guest group, the method comprising the step of subjecting a mixture containing a polymerizable monomer represented by the following formula (1b) and a polymerizable monomer represented by the following formula (2b) to a polymerization reaction to obtain the crosslinked polymer:

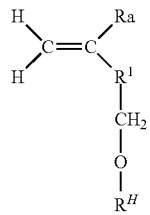
(1b)

wherein Ra represents hydrogen or methyl, and $R^1$ and $R^H$ are respectively as defined for $R^1$ and $R^H$ in formula (1a); and

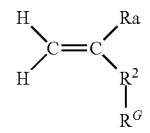
(2b)

wherein Ra represents hydrogen or methyl, and $R^2$ and $R^G$ are respectively as defined for $R^2$ and $R^G$ in formula (2a).

Item 7.

The method for producing a macromolecular material according to Item 6, wherein the mixture contains a clathrate compound formed from the polymerizable monomer represented by formula (1b) and the polymerizable monomer represented by formula (2b) by interaction between the host group in formula (1b) and the guest group in formula (2b).

Item 8.

A polymerizable monomer composition for use in a starting material for producing a macromolecular material, the composition comprising a polymerizable monomer represented by the following formula (1b) and a polymerizable monomer represented by the following formula (2b):

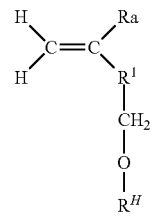
(1b)

wherein Ra represents hydrogen or methyl, and $R^1$ and $R^H$ are respectively as defined for $R^1$ and $R^H$ in formula (1a); and

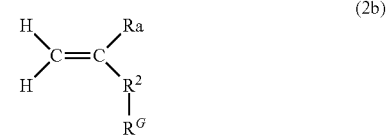
(2b)

wherein Ra represents hydrogen or methyl, and $R^2$ and $R^G$ are respectively as defined for $R^2$ and $R^G$ in formula (2a).

Item 9.

The polymerizable monomer composition according to Item 8, comprising a clathrate compound formed from the polymerizable monomer represented by formula (1b) and the polymerizable monomer represented by formula (2b) by interaction between the host group of the polymerizable monomer represented by formula (1b) and the guest group of the polymerizable monomer represented by formula (2b):

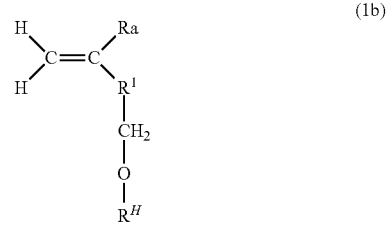
(1b)

wherein Ra represents hydrogen or methyl, and $R^1$ and $R^H$ are respectively as defined for $R^1$ and $R^H$ in formula (1a); and

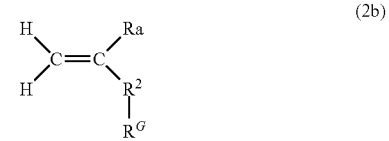
(2b)

wherein Ra represents hydrogen or methyl, and $R^2$ and $R^G$ are respectively as defined for $R^2$ and $R^G$ in formula (2a).

Item 10.

A polymerizable monomer for producing a macromolecular gel comprising a crosslinked polymer that is crosslinked by interaction between a host group and a guest group, the polymerizable monomer being represented by the following formula (1b)

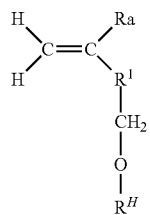

wherein Ra represents hydrogen or methyl, $R^H$ represents the host group, and $R^1$ represents a divalent group formed by removing one hydrogen atom from a monovalent group selected from the group consisting of hydroxyl, thiol, alkoxy optionally having at least one substituent, thioalkoxy optionally having at least one substituent, alkyl optionally having at least one substituent, amino optionally having one substituent, amide optionally having one substituent, aldehyde, and carboxyl.

Item 11.

A method for producing a polymerizable monomer substituted with a host molecule, the method comprising the step of subjecting a polymerizable monomer represented by the following formula (5) and the host molecule to dehydration condensation in a solvent in the presence of an acid catalyst:

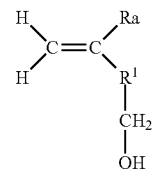

wherein Ra represents hydrogen or methyl, and $R^1$ represents a divalent group formed by removing one hydrogen atom from a monovalent group selected from the group consisting of hydroxyl, thiol, alkoxy optionally having at least one substituent, thioalkoxy optionally having at least one substituent, alkyl optionally having at least one substituent, amino optionally having one substituent, amide optionally having one substituent, aldehyde, and carboxyl.

Advantageous Effects of Invention

The macromolecular material according to the present invention is highly tough, excellent in mechanical strength, and also has self-healing properties.

The method for producing a macromolecular material according to the present invention is suitable for producing such a macromolecular material, and can produce the macromolecular material through a simple process at low cost.

The polymerizable monomer composition according to the present invention is a starting material suitable for producing a macromolecular material with high toughness, and the use of the starting material enables the production of a macromolecular material that has high toughness and self-healing properties in a simple manner.

BRIEF DESCRIPTION OF DRAWINGS

FIG. 18(a) shows a puncture strength test, FIG. 18(b) shows the initial part of a tensile test, FIG. 18(c) shows a macromolecular gel just after being subjected to a tensile test, and FIG. 18(d) shows a self-healing test.

DESCRIPTION OF EMBODIMENTS

Figure 1:
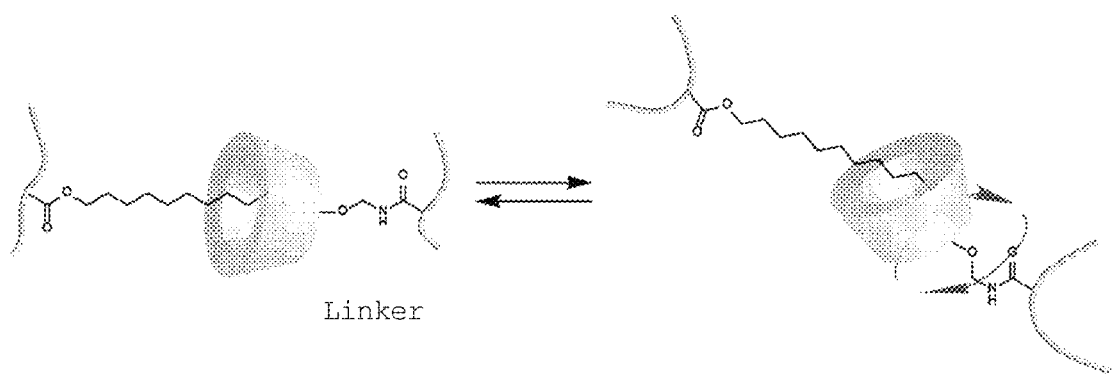
FIG. 1 is a diagram illustrating host-guest interaction in a crosslinked polymer.

The following describes embodiments of the present invention in detail. In this specification, the terms "comprise" and "contain" include the concepts of "comprise," "contain," "consist essentially of," and "consist of."

Macromolecular Material

The macromolecular material in this embodiment contains a crosslinked polymer that is crosslinked by interaction between a host group and a guest group. In particular, the crosslinked polymer contains the repeating structural unit represented by the following formula (1a) and the repeating structural unit represented by the following formula (2a):

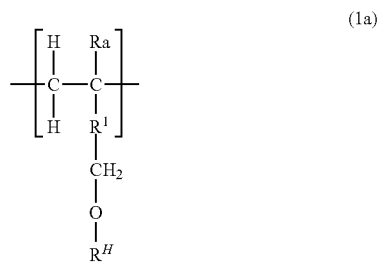

wherein Ra represents hydrogen or methyl, $R^H$ represents a host group, and $R^1$ represents a divalent group formed by removing one hydrogen atom from a monovalent group selected from the group consisting of hydroxyl, thiol, alkoxy optionally having at least one substituent, thioalkoxy optionally having at least one substituent, alkyl optionally having at least one substituent, amino optionally having one substituent, amide optionally having one substituent, aldehyde, and carboxyl; and

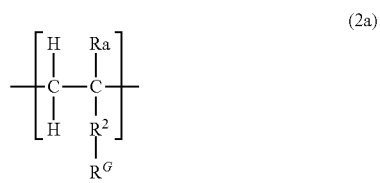

wherein Ra represents hydrogen or methyl, $R^G$ represents a guest group, and $R^2$ represents a divalent group formed by removing one hydrogen atom from a monovalent group selected from the group consisting of hydroxyl, thiol, alkoxy optionally having at least one substituent, thioalkoxy optionally having at least one substituent, alkyl optionally having at least one substituent, amino optionally having one substituent, amide optionally having one substituent, aldehyde, and carboxyl.

The macromolecular material structured as described above exhibits high toughness, and is thus a material excellent in mechanical strength.

Just to note, Ra in formula (1a) and Ra in formula (2a) may be identical or different from each other.

Specific examples of the macromolecular material include macromolecular gels, and also xerogels, which are dry forms of macromolecular gels. Additionally, the macromolecular material includes film components contained in paint and adhesive components contained in adhesives; however, the macromolecular material is not limited to these examples. In particular, the macromolecular material is preferably a macromolecular gel, which especially enables the use of the characteristics of the macromolecular material described above.

The crosslinked polymer serves as a matrix component of the macromolecular material. The crosslinked polymer is formed of polymer chains that are crosslinked, and has a "three-dimensional network structure."

The crosslinked polymer has a crosslinked structure formed via crosslinking points, which are the bonds formed by the interaction between the host group in the repeating structural unit represented by formula (1a) and the guest group in the repeating structural unit represented by formula (2a) ("host-guest interaction"). The host-guest interaction can occur, for example, due to the hydrophobic interaction, hydrogen bond, van der Waals force, electrostatic interaction, coordinate bond, or n-electron interaction between the host group and the guest group; however, there is no limitation to these.

The host group ($R^H$) in the repeating structural unit represented by formula (1a) is a functional group derived from a host molecule capable of having host-guest interaction with the guest group ($R^G$), which is described later. The type of such a host molecule is not particularly limited.

The host molecule is, for example, at least one member selected from the group consisting of α-cyclodextrin, β-cyclodextrin, γ-cyclodextrin, calix[6]arene sulfonic acid, calix[8]arene sulfonic acid, 12-crown-4, 18-crown-6, [6]paracyclophane, [2,2]paracyclophane, cucurbit[6]uril, and cucurbit[8]uril. These host molecules may further be substituted.

The host molecule is preferably at least one member selected from the group consisting of α-cyclodextrin, β-cyclodextrin, and γ-cyclodextrin. A host group formed from these host molecules is resistant to the dissolution of host-guest interaction, and is thus likely to form a macromolecular gel with excellent toughness.

In this specification, host molecules such as α-cyclodextrin, β-cyclodextrin, and γ-cyclodextrin may also be referred to as a "host group." To be precise, a monovalent group formed by removing one hydrogen atom or one hydroxyl group from a molecule such as α-cyclodextrin, β-cyclodextrin, and γ-cyclodextrin is the host group, but the host molecules may be referred to as a "host group" for convenience in this specification.

When $R^1$ in formula (1a) is a divalent group formed by removing one hydrogen atom from alkoxy, examples of the alkoxy include $C_{1-10}$ alkoxy. Specific examples include methoxy, ethoxy, propoxy, isopropoxy, butoxy, isobutoxy, sec-butoxy, pentyloxy, and hexyloxy. These alkoxy groups may be linear or branched alkoxy.

When $R^1$ in formula (1a) is a divalent group formed by removing one hydrogen atom from thioalkoxy, examples of the thioalkoxy include $C_{1-10}$ thioalkoxy. Specific examples include methylthio, ethylthio, propylthio, isopropylthio, butylthio, isobutylthio, sec-butylthio, pentylthio, and hexylthio. These thioalkoxy groups may be linear or branched thioalkoxy.

When $R^1$ in formula (1a) is a divalent group formed by removing one hydrogen atom from alkyl, examples of the alkyl include $C_{1-30}$ alkyl. Specific examples include methyl, ethyl, propyl, isopropyl, butyl, isobutyl, sec-butyl, tert-butyl, pentyl, isopentyl, neopentyl, and hexyl. These alkyl groups may be linear or branched alkyl.

When $R^1$ in formula (1a) is a divalent group formed by removing one hydrogen atom from amino optionally having one substituent, the nitrogen atom of amino can bond to a carbon atom in the main chain (C—C bond).

When $R^1$ in formula (1a) is a divalent group formed by removing one hydrogen atom from amide optionally having one substituent, the carbon atom of amide can bond to a carbon atom in the main chain (C—C bond).

When $R^1$ in formula (1a) is a divalent group formed by removing one hydrogen atom from aldehyde, the carbon atom of aldehyde can bond to a carbon atom in the main chain (C—C bond).

When $R^1$ in formula (1a) is a divalent group formed by removing one hydrogen atom from carboxyl, the carbon atom of carboxyl can bond to a carbon atom in the main chain (C—C bond).

$R^1$ in formula (1a) is preferably a divalent group formed by removing one hydrogen atom from hydroxyl, carboxyl, or amide optionally having one substituent (i.e., —O— (ether bond), —COO— (ester bond), or —CO—NH— (amide bond)), and particularly preferably a divalent group formed by removing one hydrogen atom from amide optionally having one substituent (—CO—NH—).

The guest group ($R^G$) in the repeating structural unit represented by formula (2a) is a functional group formed by substituting the repeating structural unit, at its side chain, with a guest molecule capable of having host-guest interaction with the host group ($R^H$) described above. The type of such a guest molecule is not particularly limited.

The guest molecule is, for example, at least one member selected from the group consisting of $C_{4-18}$ chain or cyclic hydrocarbons and alcohol derivatives thereof; aryl compounds; carboxylic acid derivatives; amino derivatives; azobenzene derivatives having cyclic alkyl or phenyl; cinnamic acid derivatives; aromatic compounds and alcohol derivatives thereof; amine derivatives; ferrocene derivatives; azobenzenes; naphthalene derivatives; anthracene derivatives; pyrene derivatives; perylene derivatives; clusters formed from carbon atoms such as fullerene; and dansyl compounds. These guest molecules may further be substituted.

$C_{4-18}$ hydrocarbons include alkyl compounds, such as butane, hexane, cyclohexane, heptane, octane, nonane, decane, undecane, dodecane, tetradecane, pentadecane, hexadecane, heptadecane, octadecane, and adamantane. These compounds may be linear or branched. These compounds may further be substituted with hydroxyl, not more than 4 carbon atoms (preferably not more than 2 carbon atoms), carboxyl, or amino. $C_{6-18}$ hydrocarbons may have, for example, 1 to 3 substituents such as halogen (e.g., fluorine, chlorine, and bromine), carboxyl, ester, amide, and optionally protected hydroxyl. $C_{6-18}$ hydrocarbons may also have an unsaturated bond. $C_{6-18}$ hydrocarbons may be alkyl to which ferrocene, which is an organometallic complex, is bonded as a substituent.

The guest molecule is preferably a $C_{4-18}$ alkyl compound. In particular, the guest molecule is preferably a $C_{6-12}$ alkyl compound. Such alkyl compounds are resistant to the dissolution of host-guest interaction, and is thus likely to form a macromolecular gel with excellent toughness. Additionally, $C_{4-18}$ alkyl compounds are preferably linear. Such alkyl compounds are resistant to the dissolution of host-guest interaction, and are thus likely to form a macromolecular gel with remarkably excellent toughness.

$R^2$ in formula (2a) is as defined for $R^1$ in formula (1a), and also binds to the main chain (C—C bond) in the same manner as does $R^1$ in formula (1a).

$R^2$ in formula (2a) is preferably a divalent group formed by removing one hydrogen atom from amide optionally having one substituent (i.e., —CO—NH—) or a divalent group formed by removing one hydrogen atom from carboxyl (i.e., —COO—).

The crosslinked polymer may further contain the repeating structural unit represented by the following formula (3a), in addition to the repeating structural units represented by formulas (1a) and (2a).

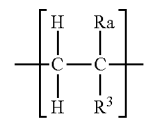

(3a)

wherein Ra represents hydrogen or methyl, and $R^3$ represents halogen, hydroxyl, thiol, amino optionally having one substituent or a salt thereof, carboxyl optionally having one substituent or a salt thereof, or amide optionally having at least one substituent or a salt thereof.

Just to note, among Ra in formula (1a), Ra in formula (2a), and Ra in formula (3a), two or all of these may be identical, or these may be all different.

When $R^3$ in formula (3a) is carboxyl having one substituent, such carboxyl includes carboxyl whose hydrogen atom is replaced with alkyl (e.g., methyl and ethyl), hydroxyalkyl (e.g., hydroxymethyl and hydroxyethyl), methoxy polyethylene glycol (the number of units in ethylene glycol is 1 to 20, preferably 1 to 10, and particularly preferably 2 to 5), or ethoxy polyethylene glycol (the number of units in ethylene glycol is 1 to 20, preferably 1 to 10, and particularly preferably 2 to 5) (i.e., esters).

When $R^3$ in formula (3a) is amide having at least one substituent (i.e., secondary amide or tertiary amide), such amide includes amide formed by replacing one or two hydrogen atoms in a primary amide group independently with alkyl (e.g., methyl, and ethyl) or hydroxyalkyl (e.g., hydroxymethyl and hydroxyethyl).

$R^3$ in formula (3a) is preferably amino; amide; amide whose hydrogen is replaced with alkyl, hydroxyl, or alkoxy; carboxyl; or carboxyl whose hydrogen is replaced with alkyl, hydroxyalkyl (e.g., hydroxyethyl), or alkoxy. When $R^3$ is so, the structure of the crosslinked polymer constituting a macromolecular gel becomes stable, likely leading to improved physical properties of the macromolecular gel.

The crosslinked polymer is formed, for example, by crosslinking polymers each containing the repeating structural unit represented by formula (1a), formula (2a), or formula (3a). The crosslinked polymer may contain a polymer that has no host group or guest group, as long as the effects of the present invention are not impaired.

In the crosslinked polymer, these different repeating structural units may be regularly arranged, or randomly arranged. Specifically, the crosslinked polymer may be a block copolymer, an alternate copolymer, or a random copolymer; the crosslinked polymer may also be a graft copolymer.

The crosslinked polymer may contain other repeating structural units, for example, known repeating structural units, as long as the effects of the present invention are not impaired.

The percentage of each of the repeating structural units represented by formula (1a), formula (2a), or formula (3a) that constitute the crosslinked polymer is not particularly limited. For example, the repeating structural unit represented by formula (1a) may be present in an amount of 0.5 to 10 mol %, and the repeating structural unit represented by formula (2a) may be present in an amount of 0.5 to 10 mol % of all of the repeating structural units of the crosslinked polymer. When the percentage of these repeating structural units is within these ranges, the host group and the guest group are prone to interaction and are thus likely to form a stable crosslinked structure, making it more likely to form a macromolecular gel having high toughness and self-healing properties. The repeating structural unit represented by formula (1a) is more preferably present in an amount of 0.5 to 6 mol %, and the repeating structural unit represented by formula (2a) is more preferably present in an amount of 0.5 to 6 mol % of all of the repeating structural units of the crosslinked polymer. When the percentage of these repeating structural units is within these ranges, the resulting macromolecular gel has further improved toughness and self-healing properties, as well as high transparency, thus having a wider range of applications. The repeating structural unit represented by formula (1a) is particularly preferably present in an amount of 2 to 4 mol %, and the repeating structural unit represented by formula (2a) is particularly preferably present in an amount of 2 to 4 mol % in the crosslinked polymer. When the percentage of these repeating structural units is within these ranges, the resulting macromolecular gel has further improved self-healing properties and high transparency, and also achieves excellent stretchability.

When the host group ($R^H$) is a functional group derived from α-cyclodextrin, the repeating structural unit represented by formula (1a) is preferably present in an amount of 1 to 3 mol % of all of the repeating structural units in the crosslinked polymer. When this is the case, the resulting macromolecular gel has further improved self-healing properties and high transparency, and also achieves excellent stretchability. When the host group ($R^H$) is a functional group derived from β-cyclodextrin, the repeating structural unit represented by formula (1a) is preferably present in an amount of 1 to 5 mol % of all of the repeating structural units in the crosslinked polymer. When this is the case, the resulting macromolecular gel has further improved self-healing properties and high transparency, and also achieves excellent stretchability. When the host group ($R^H$) is a functional group derived from γ-cyclodextrin, the repeating structural unit represented by formula (1a) is preferably present in an amount of 1 to 3 mol % of all of the repeating structural units in the crosslinked polymer. When this is the case, the resulting macromolecular gel has further improved self-healing properties and high transparency, and also achieves excellent stretchability.

The repeating structural unit represented by formula (3a) may be present in an amount of 80 to 99 mol % in the crosslinked polymer. When this repeating structural unit is present within this range, the host group and the guest group are prone to interaction, and are thus likely to form a stable crosslinked polymer, making it easier to obtain a macromolecular gel having high toughness and excellent self-healing properties.

The crosslinked polymer has in its side chains the host groups of the repeating structural units represented by formula (1a) and the guest groups of the repeating structural units represented by formula (2a), and the host-guest interaction makes crosslinking points. This is the formation of the crosslinked polymer.

Figure 24:
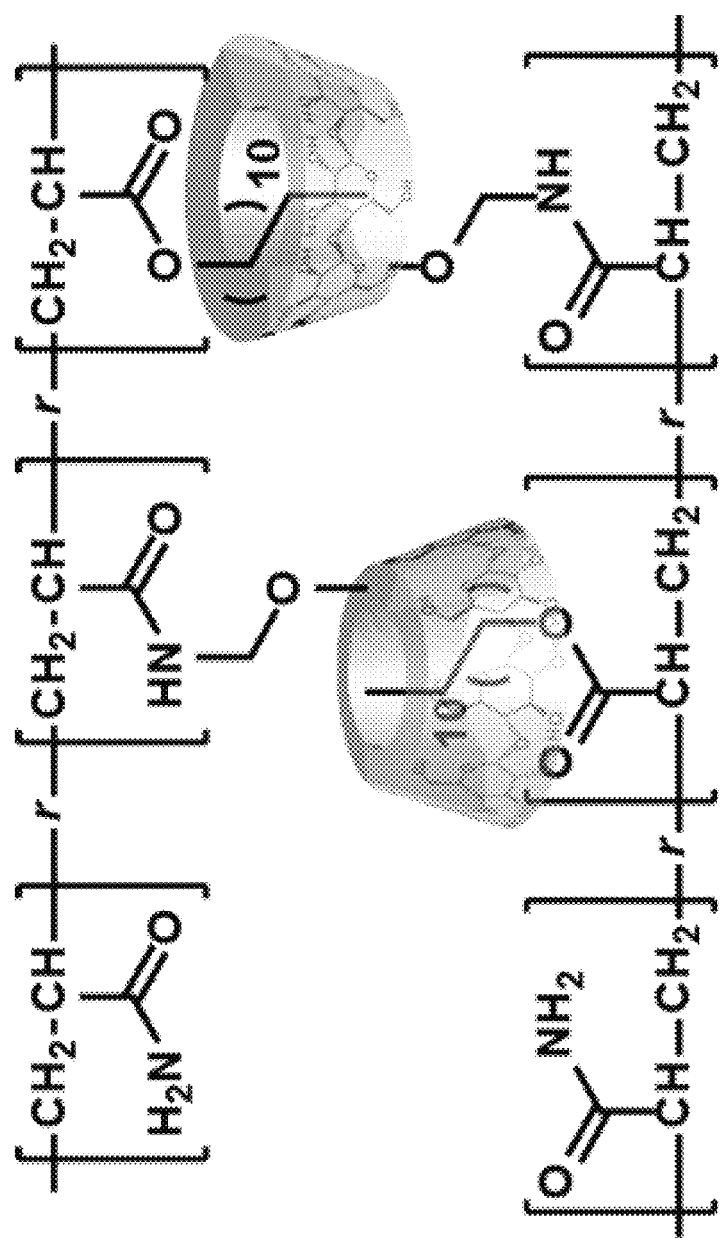
FIG. 24 illustrates the crosslinked polymer of formula (4).

Formula (4) illustrated in FIG. 24 is an example of the structure of the crosslinked polymer. In this example, the host group $R^H$ of the repeating structural unit represented by formula (1a) is a group formed by removing one hydroxyl group from α-cyclodextrin, and the guest group $R^G$ of the repeating structural unit represented by formula (2a) is a dodecyl group, with $R^3$ in the repeating structural unit represented by formula (3a) being an amide group. This crosslinked polymer is formed of polymers in which these repeating structural units are randomly arranged. In Formula (4), "-r-" indicates random arrangement of the repeating structural units.

In the crosslinked polymer shown in formula (4), the dodecyl group, which is a guest, is encapsulated in α-cyclodextrin (a group formed by removing one hydroxyl group from α-cyclodextrin), which is a host, thus forming host-guest interaction. This serves as a crosslinking point, thereby forming a crosslinked structure. Other combinations of the host group and the guest group also form host-guest interaction as in formula (4).

The crosslinked polymer in this embodiment, as described above, is characterized in that the host group $R^H$ present in the repeating structural unit represented by formula (1a) is bound to $R^1$ via —O—CH$_2$— (which may be hereinafter referred to as a "linker"). Specifically, the host group RHis bound to the oxygen atom of the linker, and one end of $R^1$ is bound to the carbon atom of the linker. Because the host group $R^H$ is bound to the side chain via this linker, the host group $R^H$ has a higher degree of freedom than without the linker. This high degree of freedom of the host group $R^H$ makes it likely for the host group $R^H$ and the guest group $R^G$ to have host-guest interaction, and thus readily forms a crosslinked polymer, resulting in a stable form of macromolecular gel.

Additionally, a macromolecular gel containing a thus-formed crosslinked polymer exhibits high toughness. One of the reasons for this high toughness of a macromolecular gel is due to the high degree of freedom of the host group $R^H$ is bound to the polymer side chain via a linker. More specifically, due to the high degree of freedom of the host group $R^H$, the dissolution of host-guest interaction is unlikely to occur, thereby giving a macromolecular gel having high toughness and excellent strength. The details are described with reference to FIG. 1.

FIG. 1 is a diagram of host-guest interaction in the crosslinked polymer of formula (4) as an example. As shown in FIG. 1, the host group (a group formed by removing one hydroxyl group from α-cyclodextrin) bound to the side chain of a polymer via a linker is distant from the main chain of the polymer because of the presence of the linker, and also has a high degree of rotational freedom because of the presence of the linker. Thus, when stress is applied to a crosslinking point of the crosslinked polymer, the guest group (dodecyl group) is unlikely to slip out of the host group, which enables high toughness.

Accordingly, against the stress applied to a macromolecular gel, a combination of a host group and a guest group that is resistant to the dissolution of host-guest interaction can make the macromolecular gel even tougher, and the mechanical strength particularly excellent. From this viewpoint, the combination of a host group and a guest group is as follows: when the host molecule that forms the host group is α-cyclodextrin, the guest group is preferably at least one member selected from the group consisting of n-butyl, n-hexyl, n-octyl, and n-dodecyl; when the host molecule that forms the host group is β-cyclodextrin, the guest group is preferably at least one member selected from the group consisting of adamantyl, adamantyl substituted with hydroxyl, adamantyl substituted with ethyl, and isobornyl; and when the host molecule that forms the host group is γ-cyclodextrin, the guest group is preferably at least one member selected from the group consisting of n-octyl, n-dodecyl, and cyclododecyl.

Examples of the solvent contained in the macromolecular gel include aqueous solvents. Specific examples of aqueous solvents include water, water-soluble alcohols, and mixture solvents thereof.

The macromolecular material may contain other additives, such as a light stabilizer, a dispersion stabilizer, an electrolyte, and a binder, as long as the effects of the present invention are not impaired.

The shape of the macromolecular material is not particularly limited, and the shape can be formed to suit the use of the macromolecular material. For example, the macromolecular material can be formed into, for example, a sheet, a film, a block, a plate, or particles, by a known means.

Due to the presence of the crosslinked polymer formed by the host-guest interaction, the macromolecular material in this embodiment can exhibit self-healing properties. Despite the high toughness of the macromolecular material, stress of a certain degree or higher breaks the macromolecular material. This rupture is due to the dissolution of the bond between the host group and the guest group. When these ruptured parts are, for example, artificially brought into contact with each other, the host group and the guest group bond again. This then leads to the re-bonding of the ruptured parts, causing self-healing of the ruptured macromolecular material. Due to its self-healing properties, the macromolecular material in this embodiment also leaves fewer historical marks made by stretching when being repeatedly stretched. Because of such properties, the macromolecular material is particularly suitable for forming a macromolecular gel.

Additionally, the host-guest interaction is prone to forming a clathrate again after dissolution of interaction; thus, the macromolecular gel after being re-adhered easily regains the initial gel strength. The strength recovery percentage also increases to the degree that the adhesion time increases.

The macromolecular material may be in the form of xerogel, which is prepared by drying off the solvent contained in the macromolecular gel. Such a xerogel also exhibits excellent toughness as does the macromolecular gel.

Method for Producing Macromolecular Material

The following describes the method for producing a macromolecular material containing the crosslinked polymer that is crosslinked by interaction between a host group and a guest group, with reference to a macromolecular gel as an example.

The production method in this embodiment comprises the step of obtaining a crosslinked polymer by performing a polymerization reaction of a mixture containing a polymerizable monomer represented by the following formula (1b) and a polymerizable monomer represented by the following formula (2b). The polymerizable monomer represented by formula (1b) and the polymerizable monomer represented by formula (2b), hereinafter, may be respectively referred to as "monomer (1b)" and "monomer (2b)."

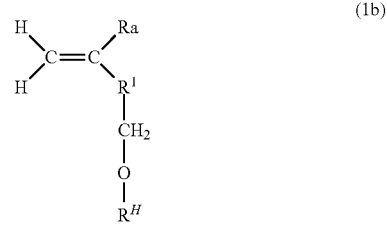

(1b)

wherein Ra represents hydrogen or methyl, and $R^1$ and $R^H$ are respectively as defined for $R^1$ and $R^H$ in formula (1a).

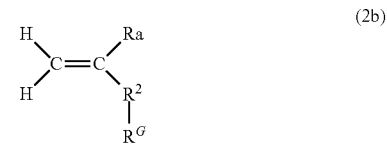

(2b)

wherein Ra represents hydrogen or methyl, and $R^2$ and $R^G$ are respectively as defined for $R^2$ and $R^G$ in formula (2a). Just to note, Ra in formula (1b) and Ra in formula (2b) may be identical or different from each other.

The polymerization reaction generates a crosslinked polymer, thus giving a macromolecular gel containing the crosslinked polymer as a matrix component.

Monomer (1b) is a polymerizable monomer capable of forming the repeating structural unit represented by formula (1a).

When $R^1$ in formula (1b) is a divalent group formed by removing one hydrogen atom from amino optionally having one substituent, the nitrogen atom of the amino can bond to the carbon atom of the C=C double bond.

When $R^1$ in formula (1b) is a divalent group formed by removing one hydrogen atom from amide optionally having one substituent, the carbon atom of the amide can bond to the carbon atom of the C=C double bond.

When $R^1$ in formula (1b) is a divalent group formed by removing one hydrogen atom from aldehyde, the carbon atom of the aldehyde can bond to the carbon atom of the C=C double bond.

When $R^1$ in formula (1b) is a divalent group formed by removing one hydrogen atom from carboxyl, the carbon atom of the carboxyl can bond to the carbon atom of the C=C double bond.

Monomer (1b) is preferably, for example, a (meth)acrylic acid ester derivative (i.e., $R^1$ is —COO—) or a (meth)acrylamide derivative (i.e., $R^1$ is —CONH—). When monomer (1b) is so, the polymerization reaction is facilitated, and the resulting macromolecular gel has higher toughness. In this specification, (meth)acrylic refers to either acrylic or methacrylic.

The host molecule for forming the host group ($R^H$) is preferably at least one member selected from the group consisting of α-cyclodextrin, β-cyclodextrin, and γ-cyclodextrin. When the host group is formed from these host molecules, the host-guest interaction becomes resistant to dissolution, which makes it more likely for the resulting macromolecular gel to have excellent toughness. The host group ($R^H$) is a monovalent group formed by removing one hydrogen atom or one hydroxyl group from α-cyclodextrin, β-cyclodextrin, or γ-cyclodextrin.

Monomer (1b) can be prepared by, for example, replacing the hydroxyl group or the hydrogen of the hydrogen atom of the hydroxyl group of a polymerizable monomer represented by the following formula (5) with a host molecule.

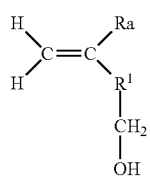

(5)

wherein Ra represents hydrogen or methyl, and $R^1$ is as defined for $R^1$ in formula (1a).

Such a polymerizable monomer substituted with a host molecule can be obtained, for example, by a production method comprising the step of subjecting the polymerizable monomer represented by formula (5) and the host molecule to dehydration condensation in a solvent, optionally in the presence of an acid catalyst. The polymerizable monomer substituted with a host molecule is, for example, monomer (1b).

When the host molecule is at least one member selected from the group consisting of α-cyclodextrin, β-cyclodextrin, and γ-cyclodextrin (which hereinafter may be simply collectively referred to as "cyclodextrin"), monomer (1b) can be produced by subjecting cyclodextrin and the polymerizable monomer represented by formula (5) to dehydration condensation.

The dehydration condensation can be performed, for example, in the presence of an acid catalyst. The acid catalyst is not particularly limited, and a wide range of known catalysts can be used. Examples of the acid catalyst include p-toluene sulfonic acid, aluminum chloride, and hydrochloric acid. The amount of the acid catalyst for use may be, for example, 20 mol % or less, and preferably 10 mol % or less of the cyclodextrin; and 0.001 mol % or more, preferably 0.01 mol % or more, and more preferably 0.1 mol % or more of the cyclodextrin.

The solvent for use in the reaction is also not particularly limited, and examples of the solvent include water, dimethyl formamide, dimethyl sulfoxide, and N-methylpyrrolidone. In particular, from the standpoint of the ease of adjusting the acid concentration and controlling the reaction, the solvent is preferably dimethyl formamide, dimethyl sulfoxide, or N-methylpyrrolidone, and particularly preferably dimethyl formamide. The reaction temperature and reaction time for dehydration condensation are also not limited, and dehydration condensation can be performed under suitable conditions. From the standpoint of smooth reaction progress, the reaction temperature is preferably 25 to 90° C., and the reaction time is preferably 1 to 3 hours. The reaction time is more preferably 5 minutes to 1 hour. After the reaction, purification may also be performed by a known purification technique.

The method for producing monomer (1b) is not limited to the production method described above, and monomer (1b) can be produced by a known method. However, the use of the dehydration condensation described above is preferable because the dehydration condensation enables the production of monomer (1b) by a one-step reaction, thus shortening the entire production process of the macromolecular gel, and simplifying the production process of the macromolecular gel.

Monomer (2b) is a polymerizable monomer capable of forming the repeating structural unit represented by formula (2a).

$R^2$ in formula (2b) is as defined for $R^2$ in formula (2a), and also binds to the C—C double bond in the same manner as does $R^2$ in formula (2a).

Monomer (2b) is preferably, for example, a (meth)acrylic acid ester or a derivative thereof (i.e., $R^1$ is —COO—), or (meth)acrylamide or a derivative thereof (i.e., $R^1$ is —CONH—). When monomer (2b) is so, the polymerization reaction easily proceeds, and the resulting macromolecular gel can have even higher toughness.

Specific examples of monomer (2b) include n-butyl (meth)acrylate, n-hexyl (meth)acrylate, n-octyl (meth)acrylate, n-dodecyl (meth)acrylate, 1-acrylamide adamantane, N-dodecyl (meth)acrylamide, t-butyl (meth)acrylate, n-dodecyl (meth) acrylate, 1-acrylamide adamantane, N-(1-adamantyl) (meth)acrylamide, N-benzyl (meth)acrylamide, N-1-naphthyl methyl (meth)acrylamide, ethoxylated o-phenyl phenol acrylate, phenoxy polyethylene glycol acrylate, isostearyl acrylate, nonyl phenol EO-adduct acrylate, and isobornyl acrylate.

Monomer (2b) can be produced by a known method.

The mixture containing a polymerizable monomer represented by formula (1b) and a polymerizable monomer represented by formula (2b) may further contain other polymerizable monomer in addition to the polymerizable monomer represented by formula (1b) and the polymerizable monomer represented by formula (2b). The other polymerizable monomer includes, for example, a polymerizable monomer represented by the following formula (3b).

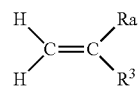

(3b)

The polymerizable monomer represented by formula (3b) may be hereinafter referred to as "monomer (3b)."

Ra in formula (3b) represents hydrogen or methyl, and $R^3$ is as defined for $R^3$ in formula (3a).

Just to note, among Ra in formula (1b), Ra in formula (2b), and Ra in formula (3b), two or all of these may be identical, or these may be all different.

Monomer (3b) is capable of forming the repeating structural unit represented by formula (3a).

Specific examples of monomer (3b) include (meth)acrylic acid, (meth)acrylamide, methyl (meth)acrylate, ethyl (meth) acrylate, N,N-dimethyl acrylamide, N-isopropyl (meth) acrylamide, N-hydroxy methyl (meth)acrylamide, N-hydroxy methyl (meth)acrylate, 2-hydroxyethyl (meth)acrylamide, 2-hydroxyethyl (meth)acrylate, ethoxy-diethylene glycol acrylate, methoxy-triethylene glycol acrylate, and methoxy-polyethylene glycol acrylate.

The mixture containing a polymerizable monomer may contain a monomer other than the polymerizable monomers represented by monomer (1b), monomer (2b), and monomer (3b), as long as the effects of the present invention are not impaired.

The proportion of monomer (1b), monomer (2b), and monomer (3b) is not particularly limited. For example, monomer (1b) may be present in an amount of 0.5 to 10 mol %, and monomer (2b) may be present in an amount of 0.5 to 10 mol % of the total amount of monomer (1b), monomer (2b), and monomer (3b). When the proportion of monomer (1b), monomer (2b), and monomer (3b) is within these ranges, the host group and the guest group are prone to interaction, and are thus likely to form a stable crosslinked polymer, making it easier to obtain a macromolecular gel having high toughness and excellent self-healing properties. Monomer (1b) is preferably present in an amount of 1 to 5 mol %, and monomer (2b) is preferably present in an amount of 1 to 5 mol % of the total amount of monomer (1b), monomer (2b), and monomer (3b). When the proportion of monomer (1b), monomer (2b), and monomer (3b) is within these ranges, the resulting macromolecular gel is likely to have further improved self-healing properties and high transparency, thus having a wider range of applications. Monomer (1b) is particularly preferably present in an amount of 2 to 4 mol %, and monomer (2b) is particularly preferably present in an amount of 2 to 4 mol % of the total amount of monomer (1b), monomer (2b), and monomer (3b). When the proportion of monomer (1b), monomer (2b), and monomer (3b) is within these ranges, the resulting macromolecular gel is likely to have further improved self-healing properties and high transparency, as well as excellent stretchability.

When the host group ($R^H$) is a functional group derived from α-cyclodextrin, monomer (1b) is preferably present in an amount of 1 to 3 mol % of the total amount of monomer (1b), monomer (2b), and monomer (3b). When the proportion of monomer (1b) is within the range, the resulting macromolecular gel has further improved self-healing properties and high transparency, as well as excellent stretchability. When the host group ($R^H$) is a functional group derived from β-cyclodextrin, monomer (2b) is preferably present in an amount of 1 to 5 mol % of the total amount of monomer (1b), monomer (2b), and monomer (3b). When the host group ($R^H$) is a functional group derived from γ-cyclodextrin, monomer (2b) is preferably present in an amount of 1 to 3 mol % of the total amount of monomer (1b), monomer (2b), and monomer (3b). When the proportion of monomer (2b) is within the range, the resulting macromolecular gel has further improved self-healing properties and high transparency, as well as excellent stretchability.

Monomer (3b) may be present in an amount of 80 to 99 mol % of the total amount of monomer (1b), monomer (2b), and monomer (3b). When the proportion of monomer (3b) is within the range, the host group and the guest group are prone to interaction, and are thus likely to form a stable crosslinked polymer, making it easier to obtain a macromolecular gel having high toughness and excellent self-healing properties.

From the standpoint of the ease of facilitating the polymerization reaction and achieving further improved toughness and particularly excellent mechanical strength of the resulting macromolecular gel, the combination of monomer (1b) and monomer (2b) is as follows: when the host molecule that forms the host group is α-cyclodextrin, the guest group is preferably at least one member selected from the group consisting of n-butyl, n-hexyl, n-octyl, and n-dodecyl; when the host molecule that forms the host group is β-cyclodextrin, the guest group is preferably at least one member selected from the group consisting of adamantyl and isobornyl; and when the host molecule that forms the host group is γ-cyclodextrin, the guest group is preferably n-octyl, n-dodecyl, cyclododecyl, or the like.

The polymerization reaction of the mixture of polymerizable monomers can be performed by a known method. For example, the polymerization reaction of the mixture may be performed in an aqueous solvent in the presence of a polymerization initiator. This enables polymerization of the mixture of polymerizable monomers, and generates a crosslinked polymer, which serves as a matrix component, thereby forming a macromolecular gel.

The aqueous solvent for use may be water. Alternatively, the aqueous solvent may be a lower alcohol, or a mixture solvent of a lower alcohol and water.

The amount of the aqueous solvent for use is not particularly limited. For example, the lower limit of the amount of the aqueous solvent for use is more preferably 50 mass %, and particularly preferably 60 mass % of the total amount of the polymerizable monomers. When the amount of the aqueous solvent is within these ranges, the resulting macromolecular gel is likely to be stable, while the physical properties such as self-healing properties are less likely to be impaired. The upper limit of the amount of the aqueous solvent for use is more preferably 150 mass %, and particularly preferably 99 mass % of the total amount of the polymerizable monomers.

Examples of the polymerization initiator include ammonium persulfate (which may be hereinafter referred to as "APS"), azobisisobutyronitrile (which may be hereinafter referred to as "AIBN"), 2,2'-azobis[2-(2-imidazolin-2-yl)propane]dihydrochloride (which may be hereinafter referred to as "VA-044"), 1,1'-azobis(cyclohexanecarbonitrile), di-tert-butyl peroxide, tert-butyl hydroperoxide, benzoyl peroxide, and a photoinitiator (e.g., Irgacure® series). The polymerization initiator is preferably APS or VA-044.

The concentration of the polymerization initiator in the mixture for use in the polymerization reaction may be 0.5 to 5 mol % of the total amount of polymerizable monomers.

When the polymerization reaction is performed, other additives may optionally be added. Examples of other additives include a polymerization accelerator and a crosslinking agent. The polymerization accelerator is, for example, N,N,N',N'-tetramethylethylene diamine. The concentration of the polymerization accelerator may be, for example, 0.5 to 5 mol % of the total amount of polymerizable monomers.

The polymerization reaction can be performed under suitable conditions, according to the degree of polymerization of the monomers for use, half-life of the polymerization initiator, the temperature, or the like. For example, the polymerization reaction can be performed by stirring the mixture at 0 to 100° C., and preferably, 20 to 25° C. The time period for the polymerization reaction may be 1 to 24 hours, and preferably 12 to 24 hours. When a photo initiator is used for the polymerization initiator, the polymerization reaction can be performed by, for example, irradiating the mixture with UV light at a wavelength of 200 to 400 nm. After such a polymerization reaction is performed, purification, drying, curing, and the like are optionally performed, thereby preparing a macromolecular gel.

The polymerization reaction may comprise the step of heating a mixture of monomer (1b) and monomer (2b) before starting a polymerization reaction (heating step). This heating step causes the host group of monomer (1b) and the guest group of monomer (2b) to interact, thus forming a clathrate compound (clathrate complex) of monomer (1b) and monomer (2b). Because of this step of heating a mixture of monomer (1b) and monomer (2b), the mixture of monomer (1b) and monomer (2b) is likely to become homogeneous, which allows the polymerization reaction to smoothly proceed, and facilitates the formation of a crosslinked structure, thereby forming a stable crosslinked structure. Thus, it is preferable in the production method according to this embodiment that the mixture of monomer (1b) and monomer (2b) for use in the polymerization reaction contains a clathrate compound formed from monomer (1b) and monomer (2b) due to the interaction between the host group of formula (1b) and the guest group of formula (2b).

In the step of heating the mixture of monomer (1b) and monomer (2b), the heating temperature may be, for example, 20 to 100° C., and preferably 50 to 80° C. Although it depends on the combination of monomer (1b) and monomer (2b), the heating time is, for example, 1 minute to 12 hours. The reaction time is more preferably 15 minutes to 1 hour. The heating means is also not particularly limited, and may be, for example, a method using a hot stirrer, or a method using a thermostatic bath. Together with heating or replacing heating, ultrasound treatment may also be performed. When ultrasound treatment is performed, a clathrate compound of monomer (1b) and monomer (2b) is more likely to form, facilitating the formation of a complex from a mixture of low temperature.

When heating the mixture of monomer (1b) and monomer (2b) while also using other polymerizable monomer such as monomer (3b), monomer (3b) may be mixed before heating monomer (1b) and monomer (2b). Alternatively, after heating the mixture of monomer (1b) and monomer (2b), monomer (3b) may be mixed. Additionally, when heating the mixture of monomer (1b) and monomer (2b), starting materials for use in polymerization reaction, such as an aqueous solvent and a polymerization initiator, may be added before heating monomer (1b) and monomer (2b), or after heating these monomers.

Whether a clathrate compound has been formed from monomer (1b) and monomer (2b) can be determined by, for example, visually observing the solution of monomer (1b) and monomer (2b) after heating monomer (1b) and monomer (2b). Specifically, when a clathrate compound is not formed, the mixture of monomer (1b) and monomer (2b) is in the form of suspension, or in the phase-separated form after being allowed to stand. When a clathrate compound is formed, the mixture becomes viscous, such as in the form of gel or cream. For the combination of a β-cyclodextrin-derived group as a host group and an isobornyl group as a guest group, it is preferable to heat the mixture containing monomer (1b) and monomer (2b) in order to form a clathrate compound. This is because mixing monomer (1b) and monomer (2b) at room temperature may lead to the precipitation of a complex as powdery crystals, causing sedimentation.

The production method as described above can provide a macromolecular gel or hydrogel that is formed so as to contain a crosslinked polymer and an aqueous solvent, such as water, due to host-guest interaction.

Due to the repeating structural units represented by formula (1a) and formula (2a), the obtained macromolecular gel is a material that exhibits high toughness and excellent mechanical strength. The macromolecular gel exhibits self-healing properties due to the crosslinked polymer formed by host-guest interaction.

Thus, the production method is suitable for preparing a macromolecular gel that has high toughness and self-healing properties. The production method can provide a desired macromolecular gel efficiently through a simple process.

For the macromolecular material other than a macromolecular gel, the production method is not particularly limited as long as the monomers described above are used. For example, a commonly used polymerization method can be used. A xerogel can be prepared by further drying the macromolecular gel obtained as described above under suitable drying conditions.

Polymerizable Monomer Composition

A polymerizable monomer composition containing the above polymerizable monomer represented by formula (1b) (monomer (1b)) and polymerizable monomer represented by formula (2b) (monomer (2b)) can be used in a starting material for producing a macromolecular gel. The use of such a polymerizable monomer composition enables the production of a macromolecular gel through a simple process, and the macromolecular gel produced by using the polymerizable monomer composition is a material that has high toughness and excellent mechanical strength due to the presence of the repeating structural units represented by formula (1a) and formula (2a).

The polymerizable monomer composition preferably contains a clathrate compound formed from monomer (1b) and monomer (2b) due to the interaction between the host group of monomer (1b) and the guest group of monomer (2b). When the composition contains a clathrate compound, monomer (1b) and monomer (2b) are likely to homogeneously mix, which allows the polymerization reaction to smoothly proceed, and facilitates the formation of a crosslinked structure, thereby producing a stable crosslinked structure.

Heating and/or performing ultrasound treatment enables the polymerizable monomer composition to contain a clathrate compound formed by monomer (1b) and monomer (2b) due to the interaction between the host group of monomer (1b) and the guest group of monomer (2b). The heating method may be performed under the same heating conditions as in the heating step described above.

The polymerizable monomer composition according to this embodiment is a starting material suitable for producing a macromolecular gel that has high toughness, and the use of this starting material enables the simple production of a macromolecular gel that has high toughness.

EXAMPLES

The following describes the present invention in more detail with reference to Examples. However, the present invention is not limited to the aspects of these Examples.

Production Example 1

Production of Acrylamide Methyl α-Cyclodextrin

Figure 25:
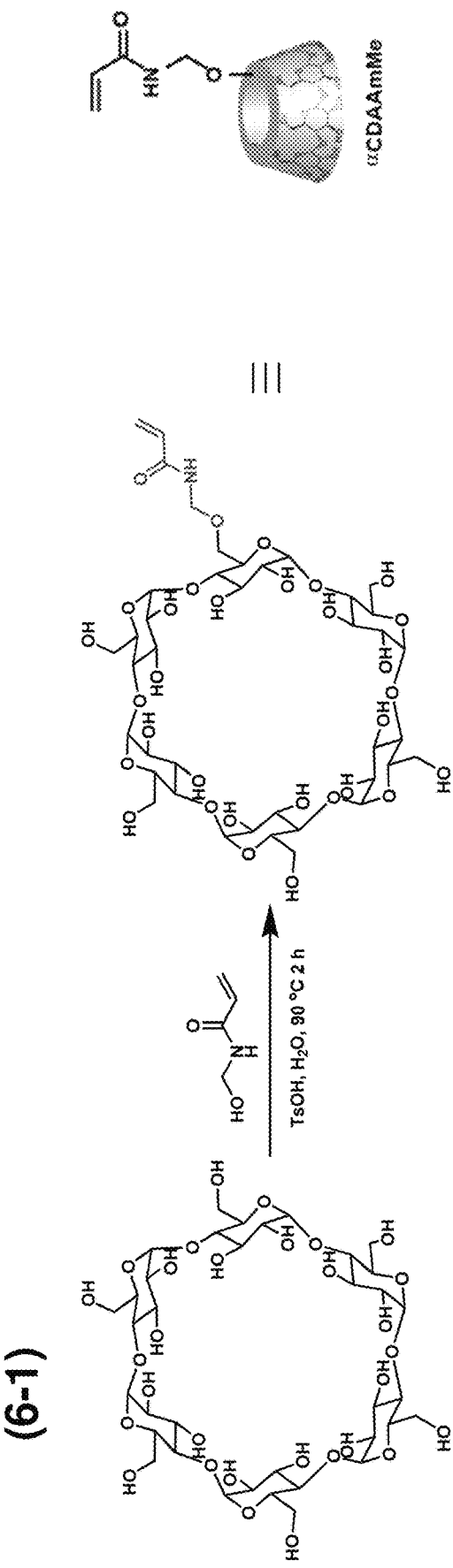
FIG. 25 illustrates reaction scheme (6-1) for producing acrylamide methyl α-cyclodextrin (α-CDAAmMe).

Acrylamide methyl α-cyclodextrin (α-CDAAmMe) was produced in accordance with the reaction scheme (6-1) shown in FIG. 25.

20 g (20 mmol) of α-cyclodextrin, 2 g (20 mmol) of N-hydroxymethyl acrylamide, and 190 mg (1 mmol, 10 mol %) of p-toluenesulfonic acid monohydrate were weighed and placed in a 300-mL-round-bottom flask, and these were then added to 50 mL of N,N-dimethylformamide, thereby preparing a mixture. This mixture was heated to 90° C. in an oil bath and heated with stirring for 1 hour. Subsequently, the reaction solution was cooled and added to 500 mL of strongly stirred acetone. The generated precipitates were filtered off and washed with 100 mL of acetone three times, followed by drying under reduced pressure at room temperature (20° C.; the same applies hereinafter) for 1 hour, thereby obtaining a reaction product. The reaction product was dissolved in 500 mL of distilled water and passed through a column packed with a porous polystyrene resin (Mitsubishi Chemical Corporation, Diaion HP-20) (apparent density: 600 g/L) to allow for adsorption for 30 minutes. Instead of this column, preparative high-pressure liquid chromatography was used to perform separation and purification in some cases. Thereafter, the solution component was removed, and 500 mL of distilled water was further passed through the column twice to wash the polystyrene resin, thereby removing unreacted α-cyclodextrin. Subsequently, 500 mL of a 30% methanol (or acetonitrile) aqueous solution was passed through the column twice to elute α-CDAAmMe, which was the target product. The solvent was removed under reduced pressure, thereby obtaining 2.1 g of a white powder. The yield was about 10%.

Production Example 2

Production of Acrylamide Methyl β-Cyclodextrin

Figure 26:
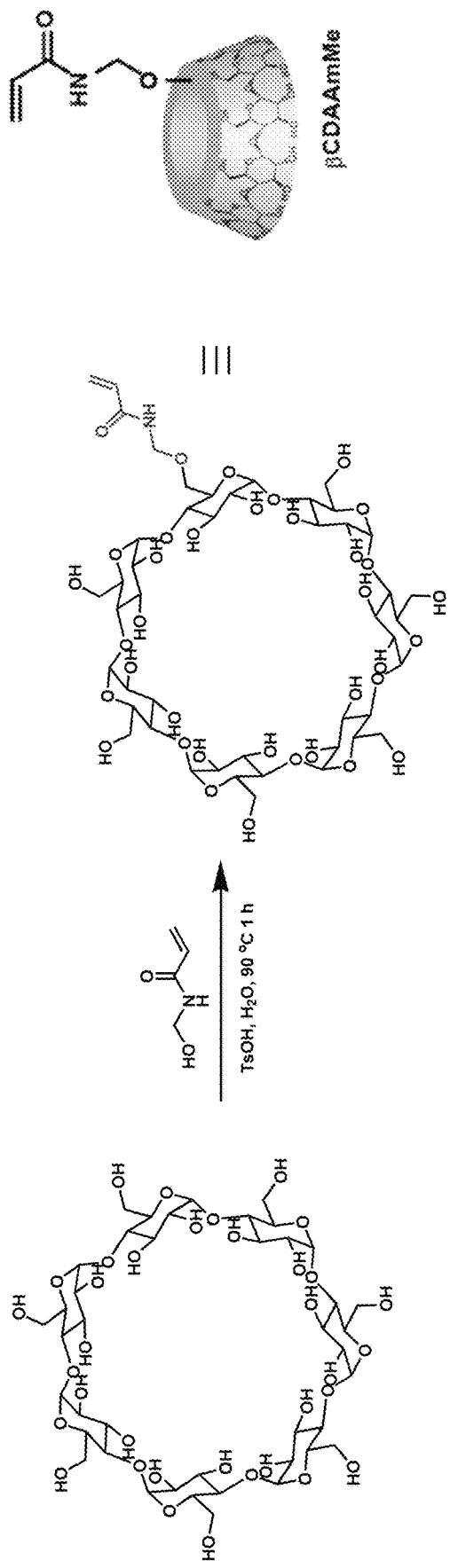
FIG. 26 illustrates reaction scheme (6-2) for producing acrylamide methyl β-cyclodextrin (β-CDAAmMe).

Acrylamide methyl β-cyclodextrin (β-CDAAmMe) was produced in accordance with the reaction scheme (6-2) shown in FIG. 26.

15 g (15 mmol) of β-cyclodextrin, 2 g (22.5 mmol) of N-hydroxymethyl acrylamide, and 500 mg (2.6 mmol, 1 wt %) of p-toluenesulfonic acid monohydrate were weighed and placed in a 200-mL-round-bottom-glass flask, and these were added to 50 mL of N,N-dimethylformamide, thereby preparing a mixture. The mixture was heated at 90° C. in an oil bath, and heated with stirring for 1 hour, thereby obtain a reaction solution. Subsequently, the reaction solution was cooled, and poured to 45 mL of strongly stirred acetone. The generated precipitates were filtered off, and washed with 10 mL of acetone three times, followed by drying under reduced pressure at room temperature for 1 hour, thereby obtaining a reaction product. The reaction product was dissolved in 100 mL of distilled water and passed through a column packed with a porous polystyrene resin (Mitsubishi Chemical Corporation: Diaion HP-20) (apparent density: 600 g/L) to allow for adsorption for 30 minutes. Instead of the column, preparative high-pressure liquid chromatography was used to perform separation and purification in some cases. Thereafter, the solution component was removed, and 50 mL of a 10% methanol (or acetonitrile) aqueous solution was further passed through the column three times to wash the polystyrene resin, thereby removing unreacted β-cyclodextrin. Subsequently, 500 mL of a 25% methanol aqueous solution was passed through the column twice to elute β-CDAAmMe, which was the target product. The solvent was removed under reduced pressure, thereby obtaining 156 mg of a white powder. The yield was about 13%.

Production Example 3

Production of Acrylamide Methyl γ-Cyclodextrin 5 g (5 mmol) of γ-cyclodextrin, 700 mg (1.3 mmol) of N-hydroxymethyl acrylamide, and 95 mg (0.5 mmol) of p-toluenesulfonic acid monohydrate were weighed and placed in a 200-mL-round-bottom-glass flask, and these were added to 25 mL of N,N-dimethylformamide, thereby preparing a mixture. The mixture was heated at 90° C. in an oil bath, and heated with stirring for 1 hour, thereby obtaining a reaction solution. Subsequently, the reaction solution was cooled and poured to 45 mL of strongly stirred acetone. The generated precipitates were filtered off and washed with 10 mL of acetone three times, followed by drying under reduced pressure at room temperature for 1 hour, thereby obtaining a reaction product. The reaction product was dissolved in 100 mL of distilled water and passed through a column packed with a porous polystyrene resin (Mitsubishi Chemical Corporation: Diaion HP-20) (apparent density: 600 g/L) to allow for adsorption for 30 minutes. Instead of the column, preparative high-pressure liquid chromatography was used to perform separation and purification in some cases. Thereafter, the solution component was removed, and 50 mL of a 10% methanol (or acetonitrile) aqueous solution was further passed through the column three times to wash the polystyrene resin, thereby removing unreacted γ-cyclodextrin. Subsequently, 500 mL of a 25% methanol aqueous solution was passed through the column twice to elute acrylamide methyl γ-cyclodextrin (γ-CDAAmMe), which was the target product. The solvent was removed under reduced pressure, thereby obtaining 809 mg of a white powder. The yield was about 15%.

Example 1

Figure 27:
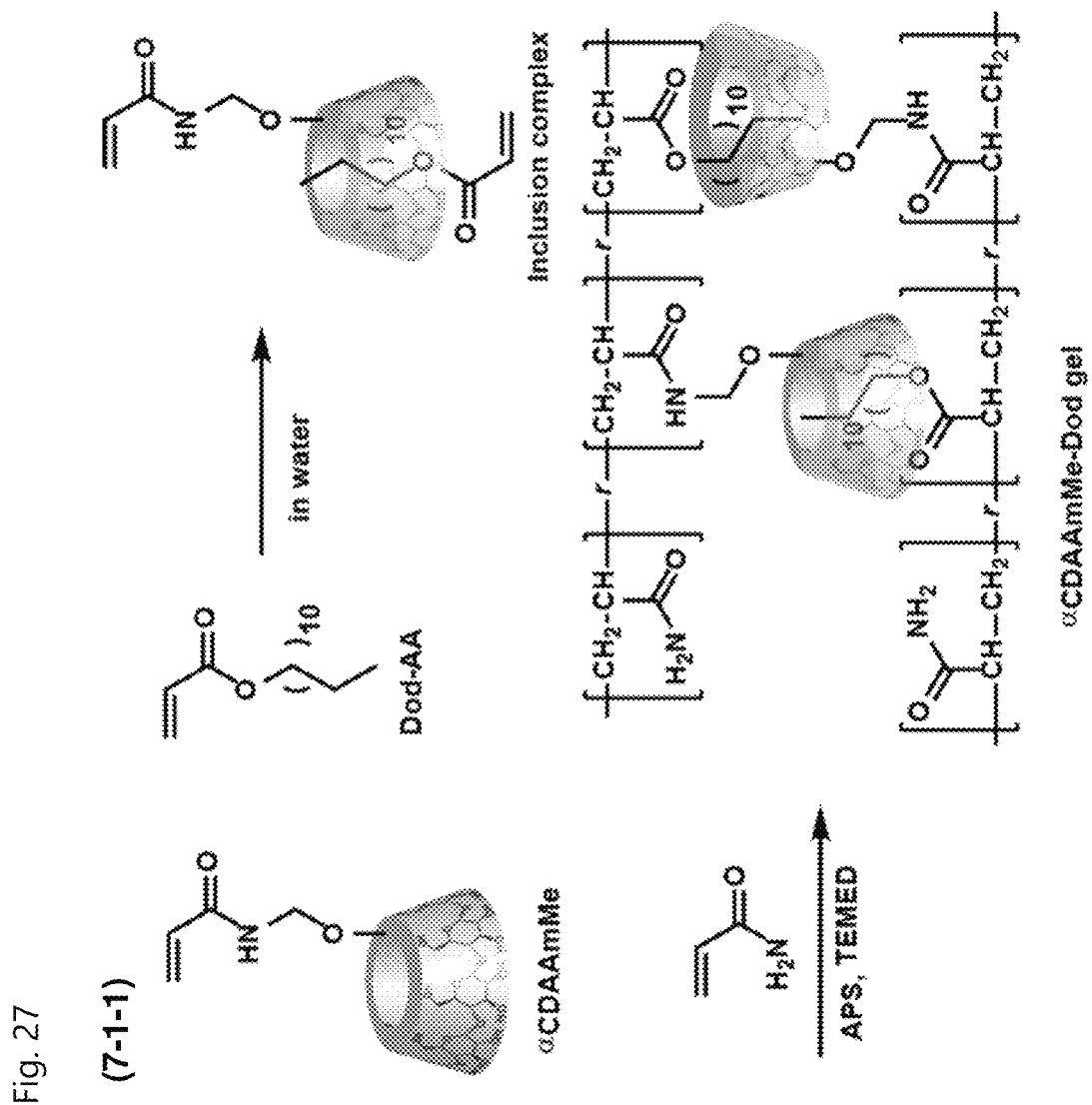
FIG. 27 illustrates reaction scheme (7-1-1) for producing a macromolecular gel.

A macromolecular gel was produced in accordance with the reaction scheme (7-1-1) shown in FIG. 27. In the scheme, "-r-" indicates a "random copolymer," in which the repeating structural units are randomly arranged. The same applies hereinafter.

211 mg of α-CDAAmMe, which is monomer (1b) obtained in Production Example 1, and 48 µL of dodecyl acrylate (Dod-AA), which is monomer (2b), were mixed in 5 mL of water such that α-CDAAmMe and dodecyl acrylate individually achieved a concentration of 2 mol/kG. The mixture was stirred at room temperature for 30 minutes by being exposed to ultrasound. At this time, the form of the reaction mixture changed from two separated liquids to an emulsion, and then to a creamy solid. 682 mg of acrylamide (AAm), which is monomer (3b), ammonium persulfate, which is a polymerization initiator (1 mol % of the total number of moles of all of the polymerizable monomers), and N,N,N',N'-tetramethyl ethylene diamine (1 mol % of the total number of moles of all of the monomers) were added in this order to the mixture that lost its flowability, and the mixture was allowed to stand at room temperature for 30 minutes to perform a polymerization reaction for gelatinization. Accordingly, a macromolecular gel containing a crosslinked polymer (α-CDAAmMe-Dod gel (x,y)) was obtained. The alphabetical symbols "x" and "y" respectively indicate mol % of the repeating structural unit (1a) and mol % of the repeating structural unit (2a) present in the crosslinked polymer. The obtained macromolecular gel was such that x=2 and y=2.

Examples 2 to 6

α-CDAAmMe-Dod gels (x,y) were prepared such that x and y meet the conditions shown in Table 1 in the same manner as in Example 1, except that the amount of α-CDAAmMe, which is monomer (1b), and the amount of dodecyl acrylate (Dod-AA), which is monomer (2b), were adjusted.

TABLE 1

| Example/Comparative Example | α-CDAAmMe-Dod Gel (x, y) | | α-CDAAm-Dod Gel (x, y) | |
| --- | --- | --- | --- | --- |
| | x | y | x | y |
| Example 2 | 1 | 1 | — | — |
| Example 1 | 2 | 2 | — | — |
| Example 3 | 3 | 3 | — | — |
| Example 4 | 4 | 4 | — | — |
| Example 5 | 5 | 5 | — | — |
| Example 6 | 6 | 6 | — | — |
| Comparative Example 1 | — | — | 3 | 3 |
| Comparative Example 2 | — | — | 4 | 4 |
| Comparative Example 3 | — | — | 5 | 5 |
| Comparative Example 4 | — | — | 6 | 6 |

Example 7

Figure 28:
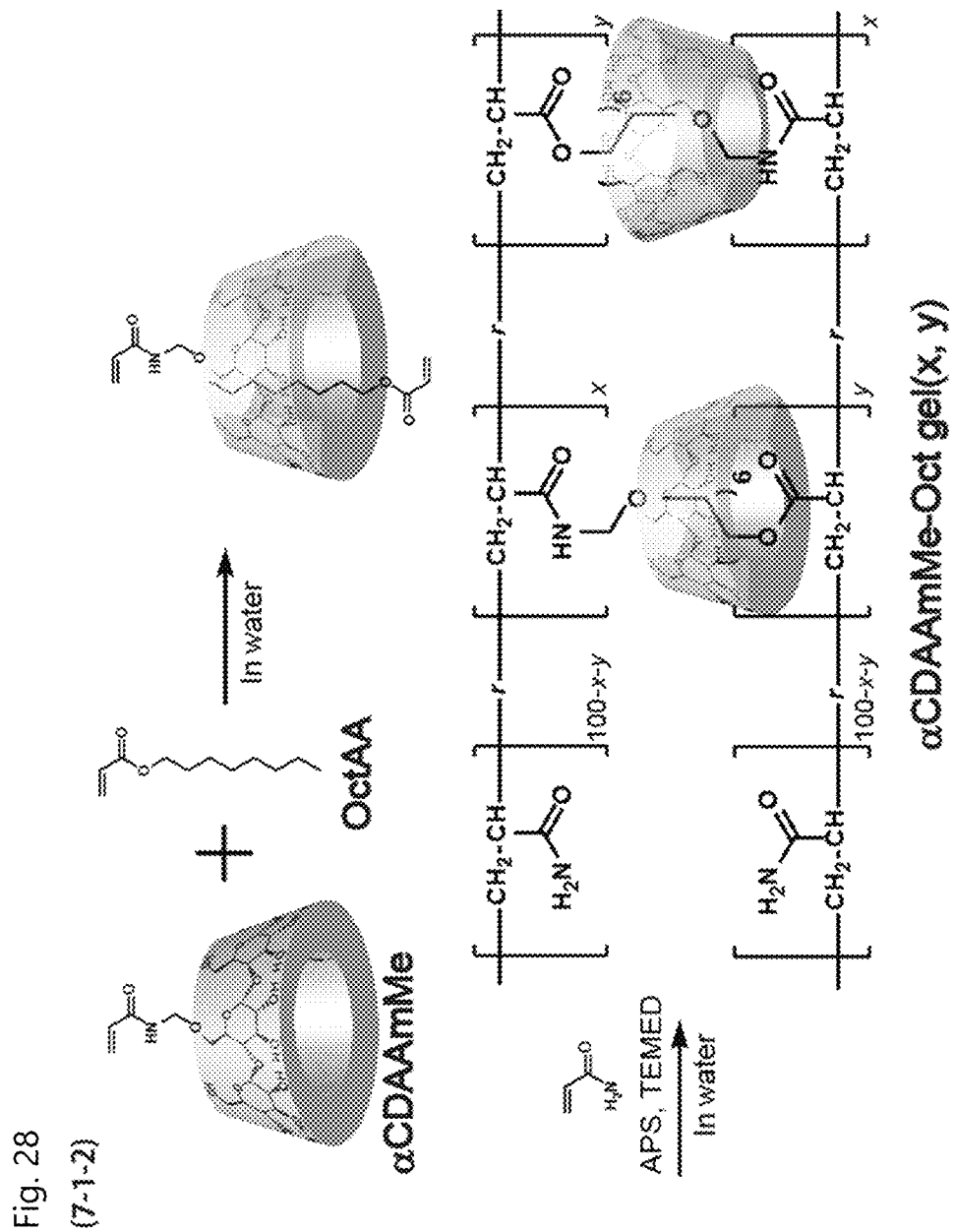
FIG. 28 illustrates reaction scheme (7-1-2) for producing a macromolecular gel.

A macromolecular gel was produced in accordance with the reaction scheme (7-1-2) shown in FIG. 28.

211 mg of α-CDAAmMe, which is monomer (1b) obtained in Production Example 1, and 48 of octyl acrylate (Oct-AA), which is monomer (2b), were mixed in 5 mL of water such that α-CDAAmMe and octyl acrylate individually achieved a concentration of 2 mol/kG. The mixture was stirred at room temperature for 30 minutes by being exposed to ultrasound. At this time, the form of the reaction mixture changed from two separated liquids to an emulsion, and then to a creamy solid. 682 mg of acrylamide (AAm), which is monomer (3b), ammonium persulfate, which is a polymerization initiator (1 mol % of the total number of moles of all of the polymerizable monomers), and N,N,N',N'-tetramethyl ethylene diamine (1 mol % of the total number of moles of all of the monomers) were added in this order to the mixture that lost its flowability, and the mixture was allowed to stand at room temperature for 30 minutes to perform a polymerization reaction for gelatinization. Accordingly, a macromolecular gel containing a crosslinked polymer (α-CDAAmMe-Oct gel (x,y)) was obtained. The alphabetical symbols "x" and "y" respectively indicate mol % of the repeating structural unit (1a) and mol % of the repeating structural unit (2a) present in the crosslinked polymer. The obtained macromolecular gel was such that x=2 and y=2. In the same manner, a macromolecular gel (x=3, y=3), a macromolecular gel (x=1, y=1), and a macromolecular gel (x=0.75, y=0.75) were also prepared.

Comparative Example 1

Figure 29:
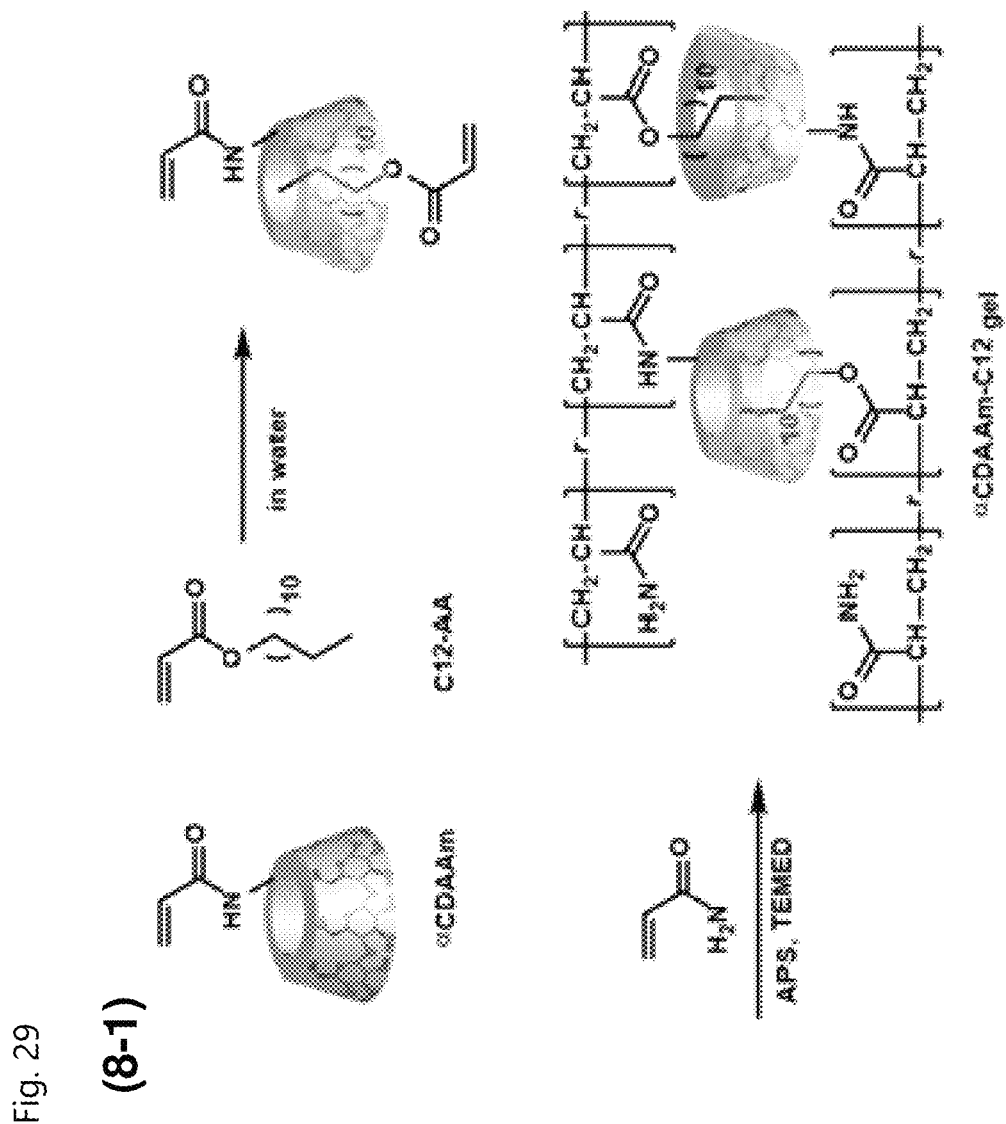
FIG. 29 illustrates reaction scheme (8-1) for a polymerization reaction.

A polymerization reaction was performed in accordance with the reaction scheme (8-1) shown in FIG. 29 in the same manner as in Example 1, except that acrylamide α-cyclodextrin (α-CDAAm) was used instead of α-CDAAmMe, which is monomer (1b) obtained in Production Example 1. Acrylamide α-cyclodextrin (α-CDAAm) has such a structure that a monovalent group formed by removing one hydroxyl group from α-cyclodextrin is bound to the nitrogen atom of acrylamide.

Accordingly, a macromolecular gel (α-CDAAm-Dod gel (x,y)) was obtained. The alphabetical symbols "x" and "y" respectively indicate mol % of the repeating structural unit derived from α-CDAAm and mol % of the repeating structural unit (2a). The obtained macromolecular gel was such that x=3, y=3.

Comparative Examples 2 to 4

α-CDAAm-Dod gels (x,y) were prepared such that x and y meet the conditions shown in Table 1 in the same manner as in Comparative Example 1, except that the amount of α-CDAAm and the amount of dodecyl acrylate (Dod-AA), which is monomer (2b), were adjusted.

Example 8

Figure 30:
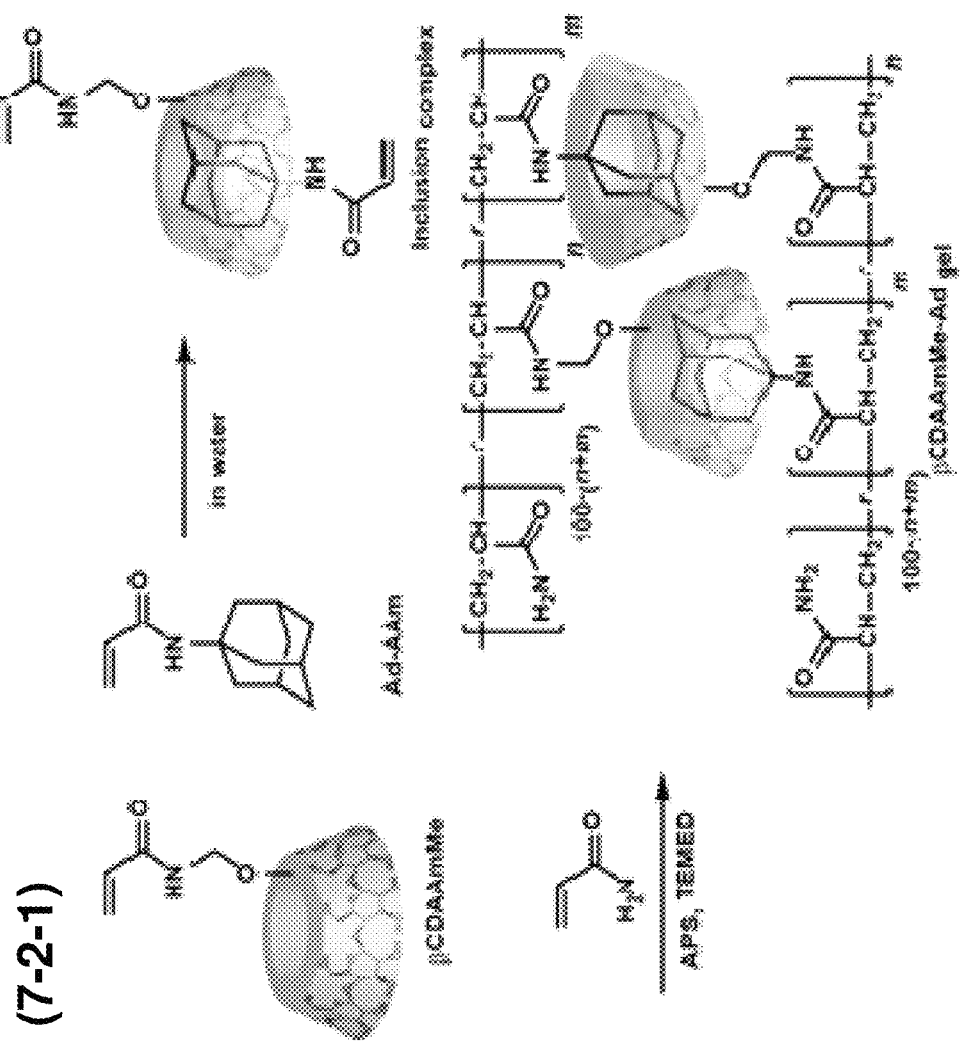
FIG. 30 illustrates reaction scheme (7-2-1) for producing a macromolecular gel.

A macromolecular gel was produced in accordance with the reaction scheme (7-2-1) shown in FIG. 30.

24.4 mg (20 μmol) of acrylamide methyl β-cyclodextrin (β-CDAAmMe), which is monomer (1b) obtained in Production Example 2, and 4.8 mg (20 μmol) of adamantane acrylamide (Ad-AAm), which is monomer (2b), were mixed in water such that acrylamide methyl β-cyclodextrin and adamantane acrylamide individually achieved a concentration of 2 mol/kG. The mixture was stirred at 80° C. for 30 minutes by being exposed to ultrasound, or stirred at 80° C. with a stir bar. At this time, the reaction mixture transformed into a transparent solution. 198 mg of acrylamide (AAm), which is monomer (3b), ammonium persulfate, which is a polymerization initiator (1 mol % of the total number of moles of all of the polymerizable monomers), and N,N,N',N'-tetramethyl ethylene diamine (1 mol % of the total number of moles of all of the monomers) were added in this order to the mixture, and the mixture was allowed to stand at room temperature for 30 minutes to perform a polymerization reaction for gelatinization. Accordingly, a macromolecular gel containing a crosslinked polymer (β-CDAAmMe-Ad gel (x,y)) was obtained. The alphabetical symbols "x" and "y" respectively indicate mol % of the repeating structural unit (1a) and mol % of the repeating structural unit (2a) present in the crosslinked polymer. The obtained macromolecular gel was such that x=1, y=1. In the same manner, a macromolecular gel (x=0.5, y=0.5), a macromolecular gel (x=0.75, y=0.75), a macromolecular gel (x=2, y=2), a macromolecular gel (x=3, y=3), a macromolecular gel (x=4, y=4), a macromolecular gel (x=5, y=5), and a macromolecular gel (x=6, y=6) were also prepared.

Example 9

Figure 31:
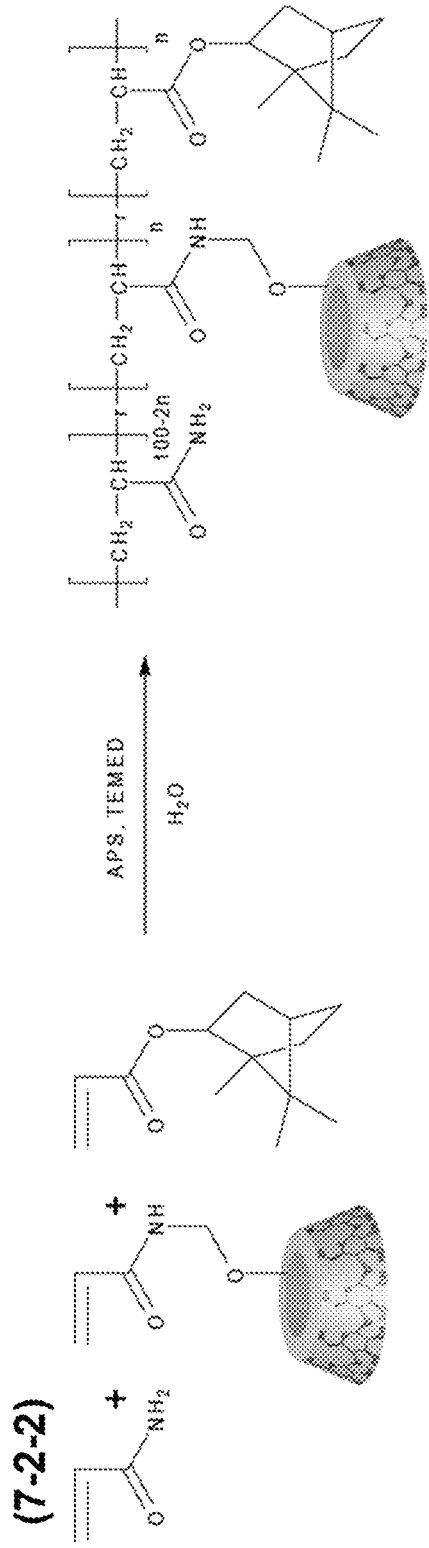
FIG. 31 illustrates reaction scheme (7-2-2) for producing a macromolecular gel.

A macromolecular gel was produced in accordance with the reaction scheme (7-2-2) shown in FIG. 31.

24.4 mg (20 μmol) of β-CDAAmMe, which is monomer (1b) obtained in Production Example 1, and 4.3 μL (20 μmol) of isobornyl acrylate (Ib-AA), which is monomer (2b), were mixed in water such that β-CDAAmMe and isobornyl acrylate individually achieved a concentration of 2 mol/kG. The mixture was stirred at 80° C. for 30 minutes by being exposed to ultrasound, or stirred at 80° C. with a stir bar. At this time, the reaction mixture transformed into a transparent solution. 198 mg of acrylamide (AAm), which is monomer (3b), ammonium persulfate, which is a polymerization initiator (1 mol % of the total number of moles of all of the polymerizable monomers), and N,N,N',N'-tetramethyl ethylene diamine (1 mol % of the total number of moles of all of the monomers) were added in this order to the mixture, and the mixture was allowed to stand at room temperature for 30 minutes to perform a polymerization reaction for gelatinization. Accordingly, a macromolecular gel containing a crosslinked polymer (β-CDAAmMe-Ib gel (x,y)) was obtained. The alphabetical symbols "x" and "y" respectively indicate mol % of the repeating structural unit (1a) and mol % of the repeating structural unit (2a) present in the crosslinked polymer. The obtained macromolecular gel was such that x=1, y=1. In the same manner, a macromolecular gel (x=0.5, y=0.5), a macromolecular gel (x=0.75, y=0.75), a macromolecular gel (x=2, y=2), and a macromolecular gel (x=3, y=3) were also prepared.

Example 10

Figure 32:
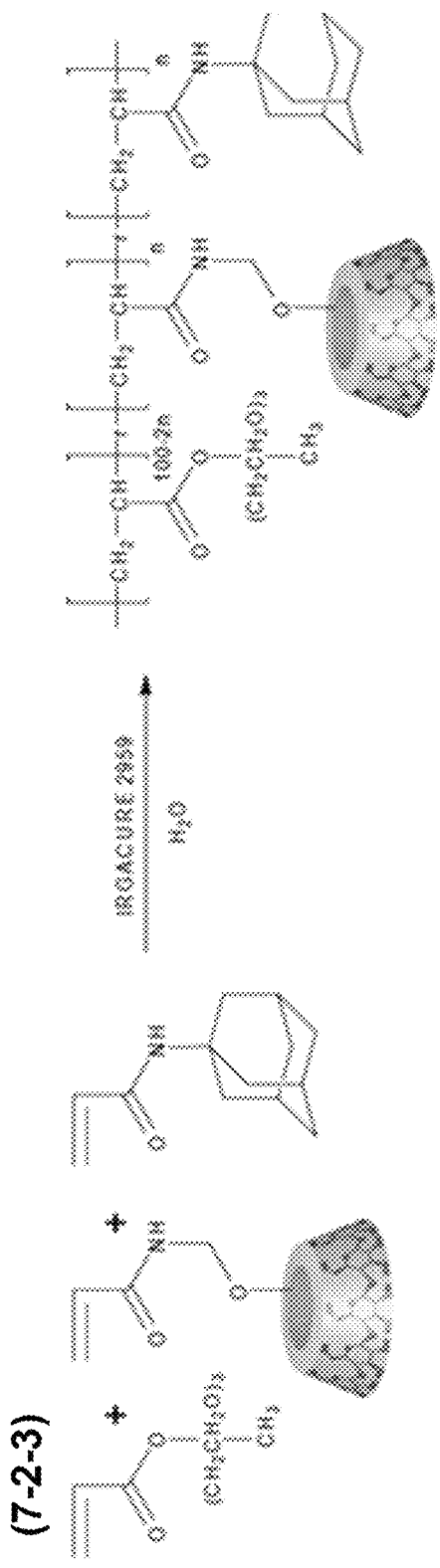
FIG. 32 illustrates reaction scheme (7-2-3) for producing a macromolecular gel.

A macromolecular gel was produced in accordance with the reaction scheme (7-2-3) shown in FIG. 32.

24.4 mg (20 µmol) of acrylamide methyl β-cyclodextrin (β-CDAAmMe), which is monomer (1b) obtained in Production Example 2, and 4.8 mg (20 µmol) of adamantane acrylamide (Ad-AAm), which is monomer (2b), were mixed in water such that acrylamide methyl β-cyclodextrin and adamantane acrylamide individually achieved a concentration of 2 mol/kG. The mixture was stirred at 80° C. for 30 minutes by being exposed to ultrasound, or stirred at 80° C. with a stir bar. At this time, the reaction mixture transformed into a transparent solution. 400 µL (1.98 mmol) of methoxytriethylene glycol acrylate (TEGAA), which is monomer (3b), ammonium persulfate, which is a polymerization initiator (1 mol % of the total number of moles of all of the polymerizable monomers), and N,N,N',N'-tetramethyl ethylene diamine (1 mol % of the total number of moles of all of the monomers) were added in this order to the mixture, and the mixture was allowed to stand at room temperature for 30 minutes to perform a polymerization reaction for gelatinization. Accordingly, a macromolecular gel containing a crosslinked polymer (β-CDAAmMe-Ad gel (x,y)) was obtained. The alphabetical symbols "x" and "y" respectively indicate mol % of the repeating structural unit (1a) and mol % of the repeating structural unit (2a) present in the crosslinked polymer. The obtained macromolecular gel was such that x=2, y=2. Additionally, a range of β-CDAAmMe-Ad gels (x,y) were also prepared by adjusting the amount of β-CDAAmMe and Ad-AAm. These obtained gels were allowed to naturally dry at room temperature under ordinary pressure for 3 days, thereby obtaining xerogels.

Example 11

Figure 33:
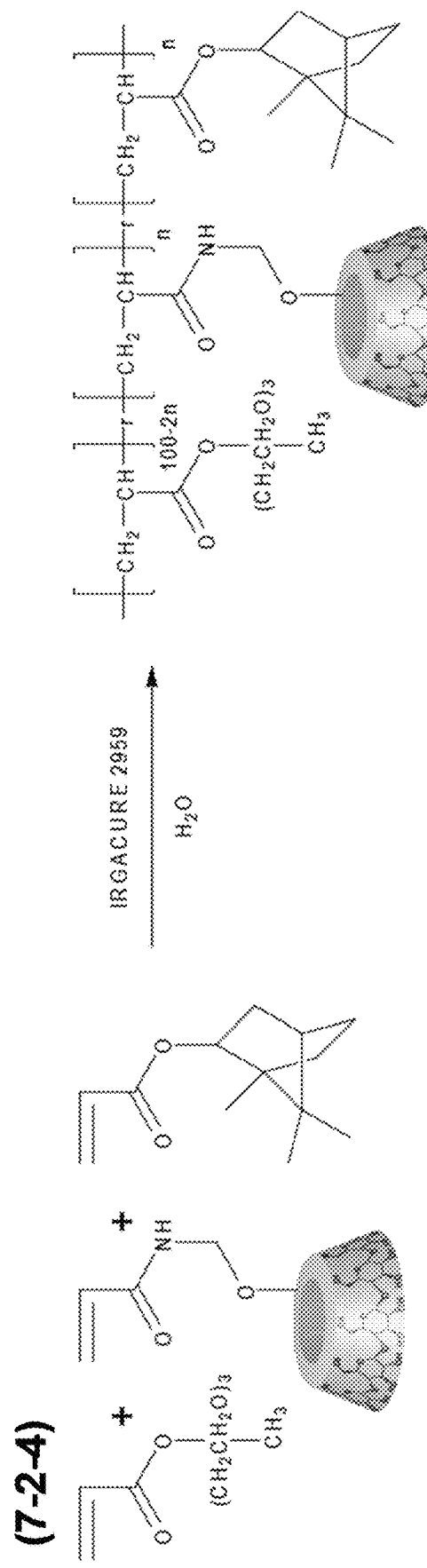
FIG. 33 illustrates reaction scheme (7-2-4) for producing a macromolecular gel.

A macromolecular gel was produced in accordance with the reaction scheme (7-2-4) shown in FIG. 33.

24.4 mg (20 µmol) of β-CDAAmMe, which is monomer (1b) obtained in Production Example 1, and 4.3 µL (20 µmol) of isobornyl acrylate (Ib-AA), which is monomer (2b), were mixed in 5 mL of water such that β-CDAAmMe and isobornyl acrylate individually achieved a concentration of 2 mol/kG. The mixture was stirred at 80° C. for 30 minutes by being exposed to ultrasound, or stirred at 80° C. with a stir bar. At this time, the reaction mixture transformed into a transparent solution. 400 µL (1.98 mmol) of methoxytriethylene glycol acrylate (TEGAA), which is monomer (3b), ammonium persulfate, which is a polymerization initiator (1 mol % of the total number of moles of all of the polymerizable monomers), and N,N,N',N'-tetramethyl ethylene diamine (1 mol % of the total number of moles of all of the monomers) were added in this order to the mixture, and the mixture was allowed to stand at room temperature for 30 minutes to perform a polymerization reaction for gelatinization. Accordingly, a macromolecular gel containing a crosslinked polymer (β-CDAAmMe-Ib gel (x,y)) was obtained. The alphabetical symbols "x" and "y" respectively indicate mol % of the repeating structural unit (1a) and mol % of the repeating structural unit (2a) present in the crosslinked polymer. The obtained macromolecular gel was such that x=2, y=2. Additionally, a range of β-CDAAmMe-Ib gels (x,y) were also prepared by adjusting the amount of β-CDAAmMe and Ib-AA. These obtained gels were allowed to naturally dry at room temperature under ordinary pressure for 3 days, thereby obtaining xerogels.

Comparative Example 5

Figure 34:
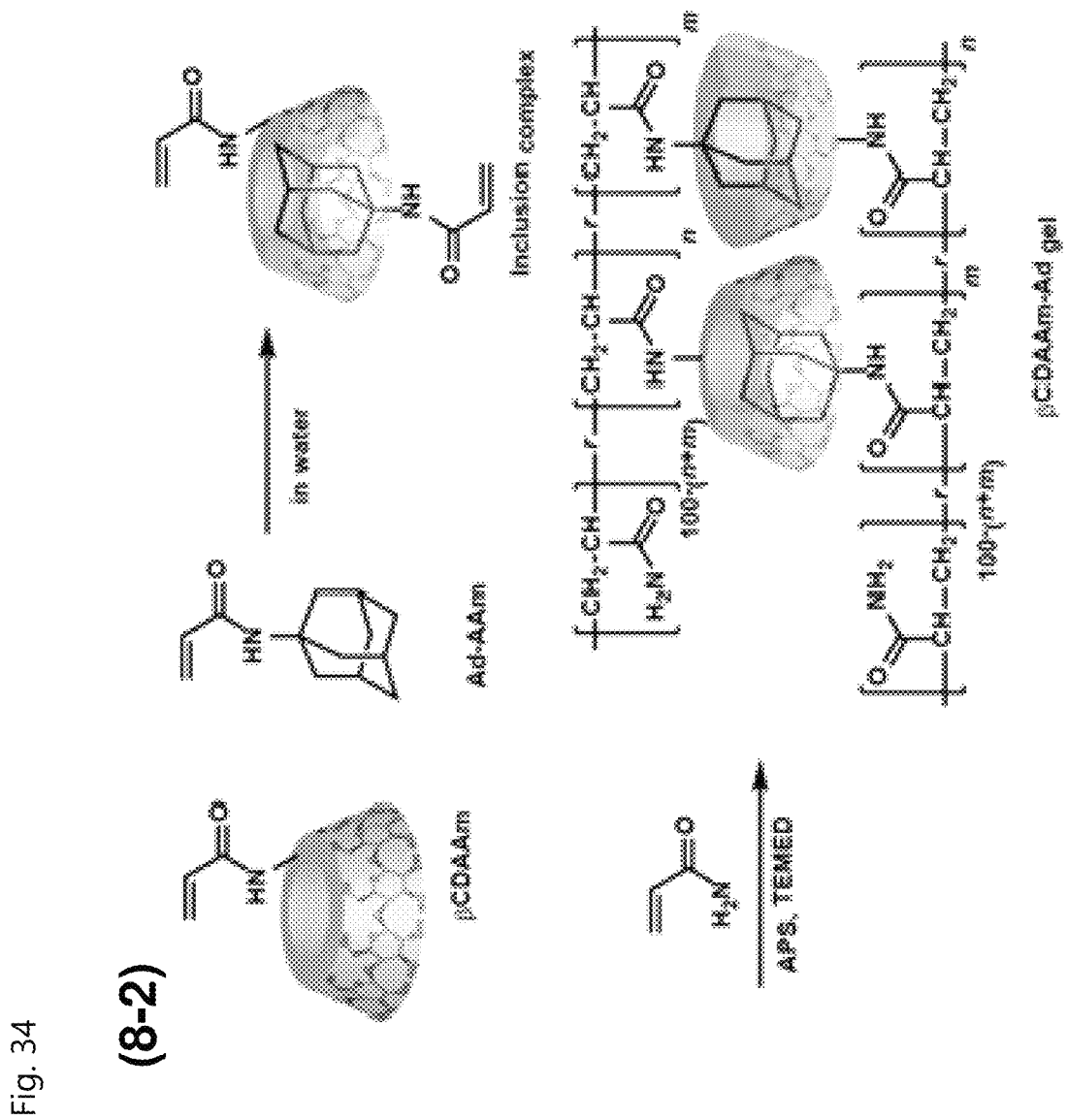
FIG. 34 illustrates reaction scheme (8-2) for a polymerization reaction.

A polymerization reaction was performed in accordance with the reaction scheme (8-2) shown in FIG. 34 in the same manner as in Example 8, except that acrylamide β-cyclodextrin (β-CDAAm) was used instead of β-CDAAmMe, which is monomer (1b) obtained in Production Example 2, thereby preparing a β-CDAAm-Ad gel (x,y). Acrylamide β-cyclodextrin (β-CDAAm) has such a structure that a monovalent group formed by removing one hydroxyl group from β-cyclodextrin is bound to the nitrogen atom of acrylamide.

Comparative Example 6

A polymerization reaction was performed in the same manner as in Comparative Example 1, except that octyl acrylate (Oct-AA) was used instead of adamantane acrylamide (Ad-AAm), thereby preparing a α-CDAAm-Oct gel (x,y).

Blank Gel

Acrylamide (0.29 g, 4.1 mmol) and methylenebisacrylamide (13 mg, 83 µmol) were dissolved in a 0.1M NaOH aqueous solution (2.0 mL). APS (19 mg, 83 µmol) and TEMED (12 µL, 83 µmol) were then added thereto to gelatinize the solution.

Example 12

Figure 35:
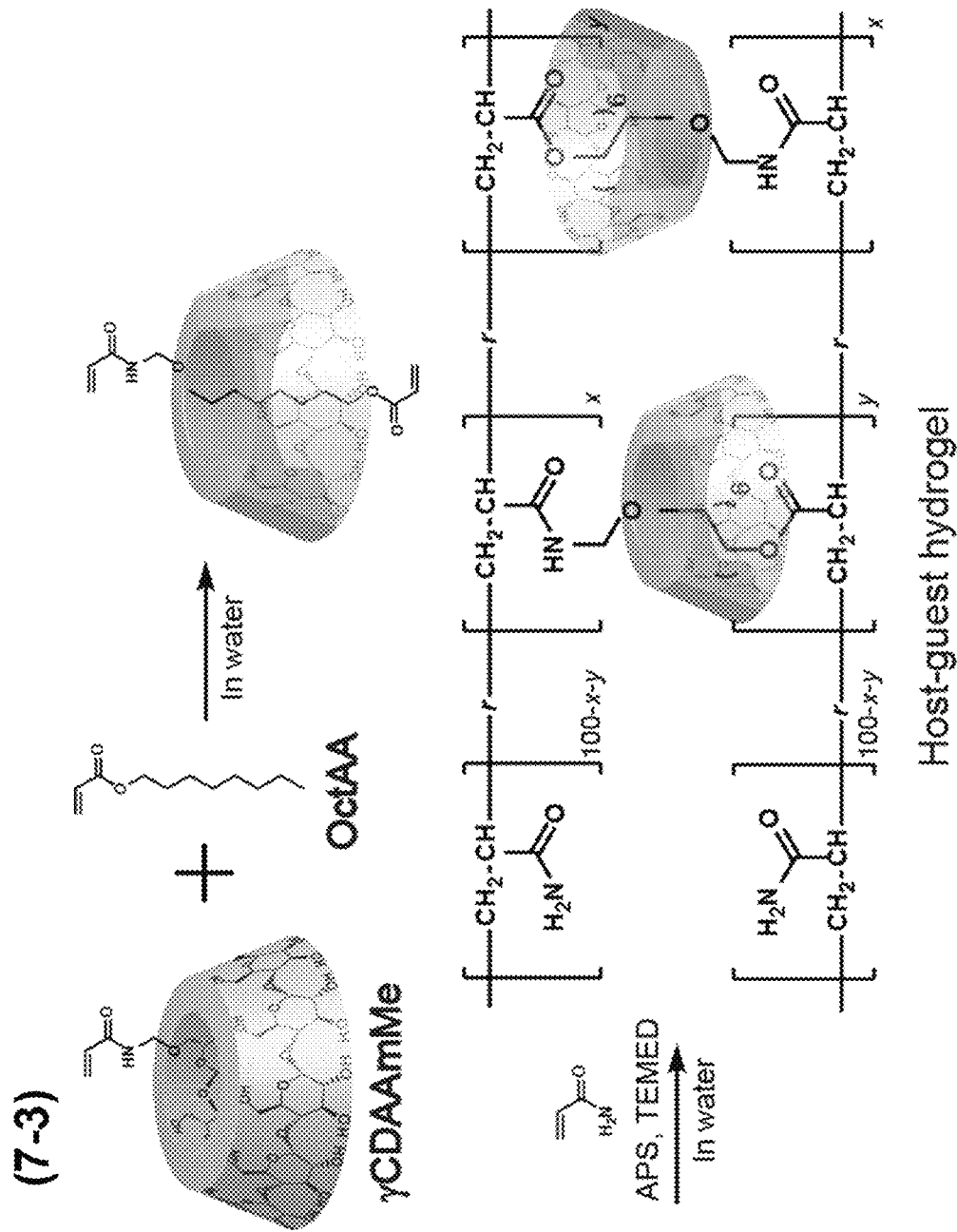
FIG. 35 illustrates reaction scheme (7-3) for producing a macromolecular gel.

A macromolecular gel was produced in accordance with the reaction scheme (7-3) shown in FIG. 35.

138 mg (100 µmol) of γ-CDAAmMe, which is monomer (1b) obtained in Production Example 3, and 18.4 mg (100 µmol) of octyl acrylate (Oct-AA), which is monomer (2b), were mixed in 5 mL of water such that γ-CDAAmMe and octyl acrylate individually achieved a concentration of 2 mol/kG. The mixture was stirred at 80° C. for 30 minutes by being exposed to ultrasound, or stirred at 80° C. with a stir bar. At this time, the reaction mixture transformed into a transparent solution. 696.6 mg of acrylamide (AAm), which is monomer (3b), ammonium persulfate, which is a polymerization initiator (1 mol % of the total number of moles of all of the polymerizable monomers), and N,N,N',N'-tetramethyl ethylene diamine (1 mol % of the total number of moles of all of the monomers) were added in this order to the mixture, and the mixture was allowed to stand at room temperature for 30 minutes to perform a polymerization reaction for gelatinization. Accordingly, a macromolecular gel containing a crosslinked polymer (γ-CDAAmMe-Oct gel (x,y)) was obtained. The alphabetical symbols "x" and "y" respectively indicate mol % of the repeating structural unit (1a) and mol % of the repeating structural unit (2a) present in the crosslinked polymer. The obtained macromolecular gel was such that x=1, y=1. Additionally, a macromolecular gel (x=0.5, y=0.5), a macromolecular gel (x=0.75, y=0.75), a macromolecular gel (x=2, y=2), and a macromolecular gel (x=3, y=3) were also prepared in the same manner as in Example 12.

Example 13

Macromolecular gels were prepared in the same manner as in Example 1, except that n-butyl acrylate (Bu-AA) was used instead of dodecyl acrylate (Dod-AA), which is monomer (2b). The obtained macromolecular gels are indicated as an α-CDAAmMe-Bu gel (x,y). The following three kinds of macromolecular gels were obtained: a macromolecular gel (x=1, y=1), a macromolecular gel (x=2, y=2), and a macromolecular gel (x=3, y=3).

Example 14

Macromolecular gels were prepared in the same manner as in Example 1, except that n-hexyl acrylate (He-AA) was used instead of dodecyl acrylate (Dod-AA), which is monomer (2b). The obtained macromolecular gels are indicated as an α-CDAAmMe-Hex gel (x,y). The following three kinds of macromolecular gels were obtained: a macromolecular gel (x=1, y=1), a macromolecular gel (x=2, y=2), and a macromolecular gel (x=3, y=3).

Example 15

Macromolecular gels were prepared in the same manner as in Example 8, except that hydroxy adamantyl acrylate was used instead of adamantane acrylamide, which is monomer (2b). The obtained macromolecular gels are indicated as a β-CDAAmMe-HAdA gel (x,y). The following three kinds of macromolecular gels were obtained: a macromolecular gel (x=1, y=1), a macromolecular gel (x=2, y=2), and a macromolecular gel (x=3, y=3). The guest group of these macromolecular gels is represented by the following formula (9), and "—O—" at the end of formula (9) indicates an ester oxygen atom in the acrylic ester moiety.

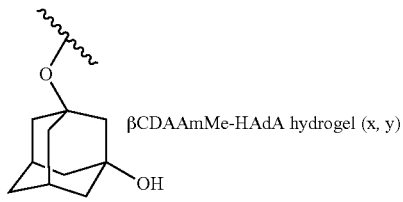

βCDAAmMe-HAdA hydrogel (x, y)     (9)

Example 16

Macromolecular gels were prepared in the same manner as in Example 8, except that ethyl adamantyl acrylate was used instead of adamantane acrylamide, which is monomer (2b). The obtained macromolecular gels are indicated as a β-CDAAmMe-EtAdA gel (x,y). The following three kinds of macromolecular gels were obtained: a macromolecular gel (x=1, y=1), a macromolecular gel (x=2, y=2), and a macromolecular gel (x=3, y=3). The guest group of these macromolecular gels is represented by the following formula (10), and "—O—" at the end of formula (10) indicates an ester oxygen atom in the acrylic ester moiety.

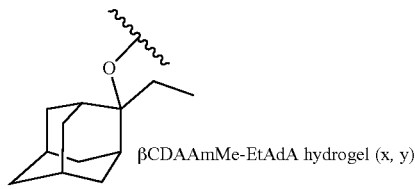

βCDAAmMe-EtAdA hydrogel (x, y)     (10)

Example 17

Xerogels were prepared in the same manner as in Example 10, except that hydroxy adamantyl acrylate was used instead of adamantane acrylamide, which is monomer (2b). The obtained xerogels are indicated as a β-CDAAmMe-HAdA gel (x,y). The following three kinds of xerogels were obtained: a macromolecular gel and a xerogel (x=1, y=1), a macromolecular gel and a xerogel (x=2, y=2), and a macromolecular gel and a xerogel (x=3, y=3).

Example 18

Xerogels were prepared in the same manner as in Example 10, except that ethyl adamantyl acrylate was used instead of adamantane acrylamide, which is monomer (2b). The obtained xerogels are indicated as a β-CDAAmMe-EtAdA gel (x,y). The following three kinds of xerogels were obtained: a macromolecular gel and a xerogel (x=1, y=1), a macromolecular gel and a xerogel (x=2, y=2), and a macromolecular gel and a xerogel (x=3, y=3).

Tensile Test

The macromolecular gels obtained in the Examples and Comparative Examples were subjected to a tensile-load curve test (Autograph AGX-plus produced by Shimadzu Corporation), and the rupture point of the macromolecular gels was observed. With this rupture point taken as the final point, the maximum stress applied until the final point was determined to be the stress-strain of a macromolecular gel. This tensile test was performed with the bottom end of a macromolecular gel fixed, and the upper end pulled at a tension rate of 0.1 to 1 mm/min (upward operation). The stroke (i.e., the maximum length of the pulled macromolecular gel) was divided by the length of the macromolecular gel before being pulled, and the resulting value was determined to be the degree of stretching.

Repeated Tensile Test

A test specimen of each of the macromolecular gels obtained in the Examples and Comparative Examples (entire length: 3.5 cm, No. 7 dumbbell shape) was set to the apparatus used in the tensile test, and stretched only 20% of the entire length of the test specimen (which is hereinafter referred to as "initial entire length"). The test stress at this time was then measured. After the test specimen of a macromolecular gel was released from the tension, the specimen was stretched again 40% of its initial entire length. The test stress at this time was measured, and the test specimen was released from the tension. The same operation was repeated by stretching the specimen 60, 80, 100, 120, 140, 160, 180, and 200% of its initial entire length in this order, and the test stress for each time was measured.

Recovery Percentage

After a xerogel was cleaved, the cut portions were adhered together at their cross-sectional surface. After a time period of T (days) passed, stress-strain was measured in the same manner as above. The value of (stress-strain after a time period of T (days)/rupture force before cleavage)×100 was calculated and determined to be a recovery percentage.

Figure 2:
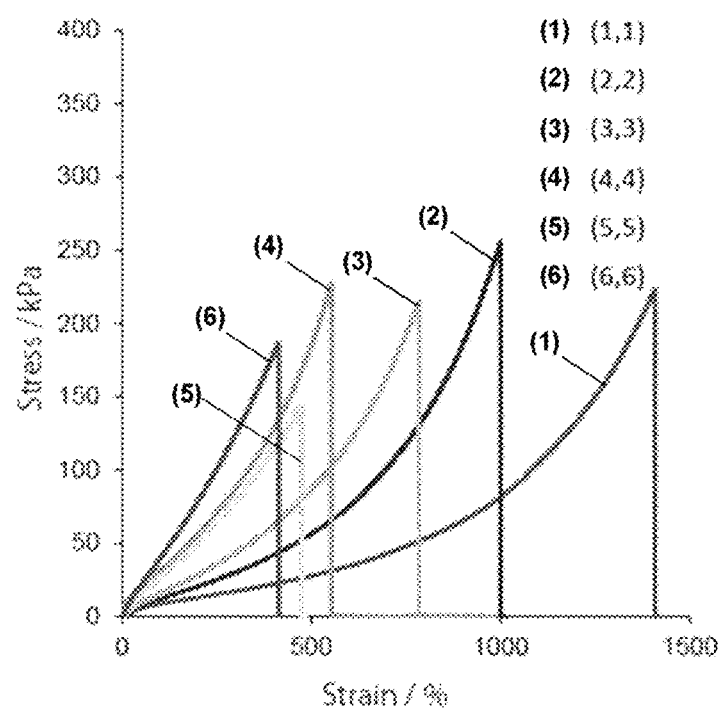
FIG. 2 illustrates tensile-load curves (stress-strain curves) of the macromolecular gels of Examples 1 to 6.

FIG. 2 illustrates tensile-load curves (stress-strain curves) of the α-CDAAmMe-Dod gels (x,y) of Examples 1 to 6. FIG. 2 indicates (x,y) of (1) to (6) sequentially as follows: (1,1), (2,2), (3,3), (4,4), (5,5), and (6,6).

Figure 3:
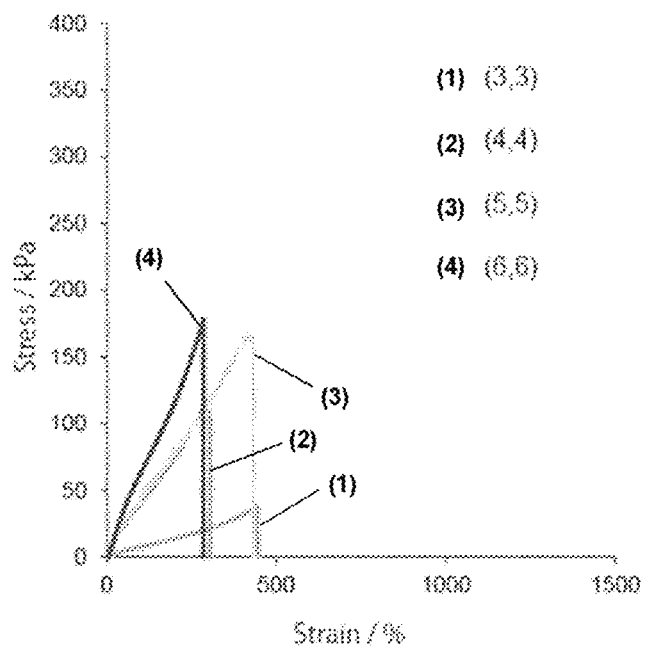
FIG. 3 illustrates stress-strain curves of the macromolecular gels of Comparative Examples 1 to 4.

FIG. 3 illustrates the stress-strain curve of the α-CDAAm-Dod gel (3,3) of Comparative Example 1, which has no linker. FIG. 3 also illustrates the stress-strain curves of α-CDAAm-Dod gels in which (x,y) is (4,4), (5,5), or (6,6).

A comparison between FIG. 3 and FIG. 2 reveals that the α-CDAAmMe-Dod gels are improved in both the stress and strain compared with the α-CDAAm-Dod gels in the same content. Thus, the α-CDAAmMe-Dod gels are considered to have higher toughness than the α-CDAAm-Dod gel of Comparative Example 1.

Figure 4:
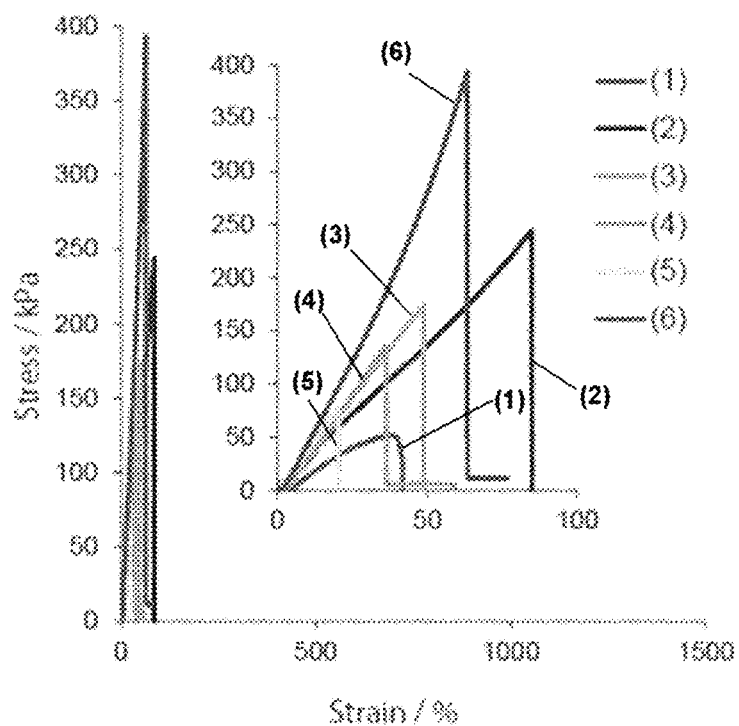
FIG. 4 illustrates stress-strain curves of conventional acrylamide gels (crosslinked with methylenebisacrylamide).

FIG. 4 illustrates stress-strain curves of six known types of acrylamide gels (gels (1) to (6) each have a methylenebisacrylamide crosslinking amount of 1 to 6 mol %). The inserted figure in FIG. 4 shows an enlarged region in which the strain is 0 to 100%. Compared to the α-CDAAmMe-Dod gels of the Examples, these gels appear to be inferior in stress and strain. These results also indicate that the α-CDAAmMe-Dod gels have high toughness.

Figure 5:
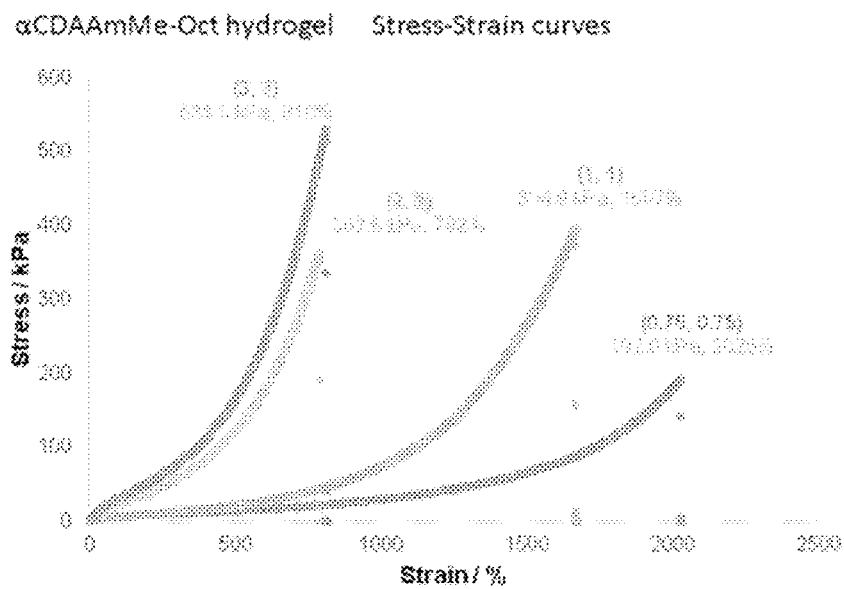
FIG. 5 illustrates stress-strain curves of the macromolecular gels of Example 7.

FIG. 5 illustrates the stress-strain curves of the α-CDAAmMe-Oct gels (x,y) of Example 7 ((x,y)=(3,3), (2,2), (1,1), and (0.75,0.75)).

Figure 6:
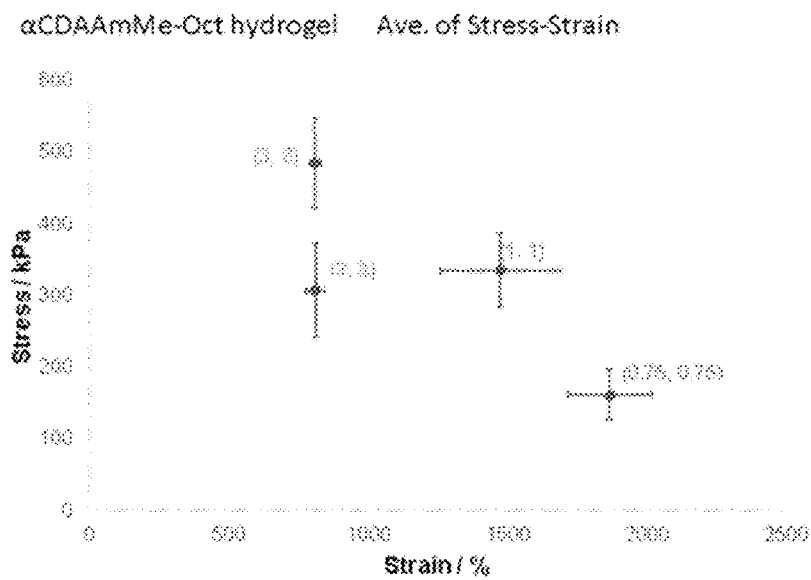
FIG. 6 is a graph illustrating the results of stress-strain of the macromolecular gels of Example 7.

FIG. 6 illustrates a summary of the results of stress-strain of each sample based on the results of measurement performed three times shown in FIG. 5.

Figure 7:
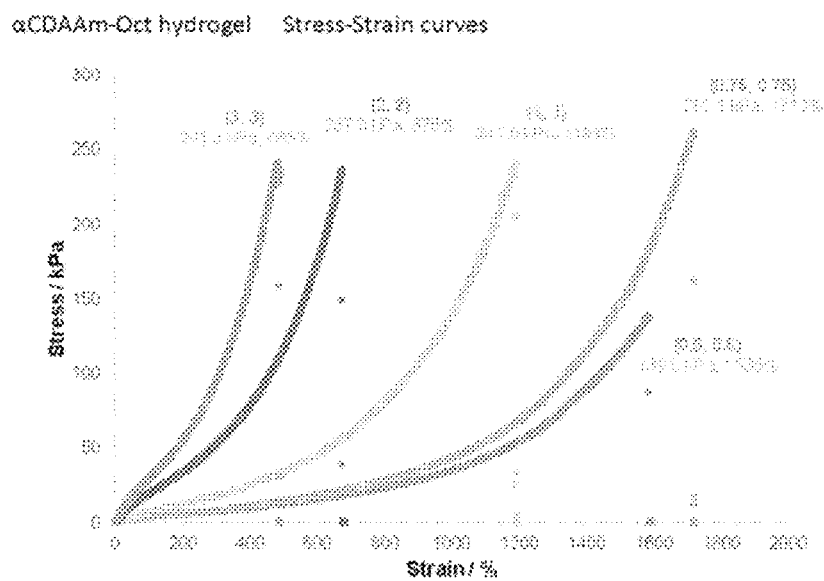
FIG. 7 illustrates stress-strain curves of the macromolecular gels of Comparative Example 6.

FIG. 7 illustrates stress-strain curves of α-CDAAm-Oct gels (x,y) that have no linker ((x,y)=(3,3), (2,2), (1,1), (0.75,0.75), and (0.5,0.5)).

Figure 8:
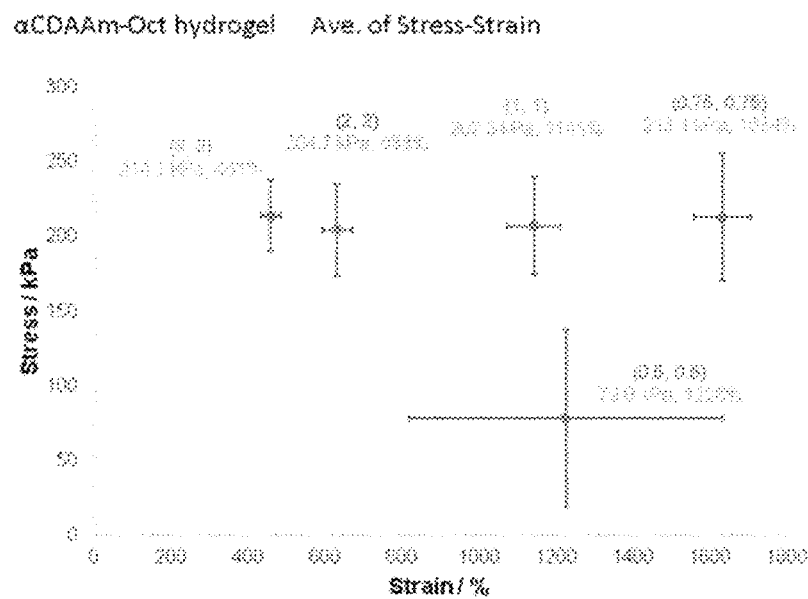
FIG. 8 is a graph illustrating the results of stress-strain of the macromolecular gels of Comparative Example 6.

FIG. 8 illustrates a summary of the results of stress-strain of each sample based on the results of measurement performed three times shown in FIG. 7.

A comparison between FIGS. 5 and 6 and FIGS. 7 and 8 reveals that α-CDAAmMe-Oct gels (x,y) that have a linker have higher toughness than α-CDAAm-Oct gels that have no linker.

Figure 9:
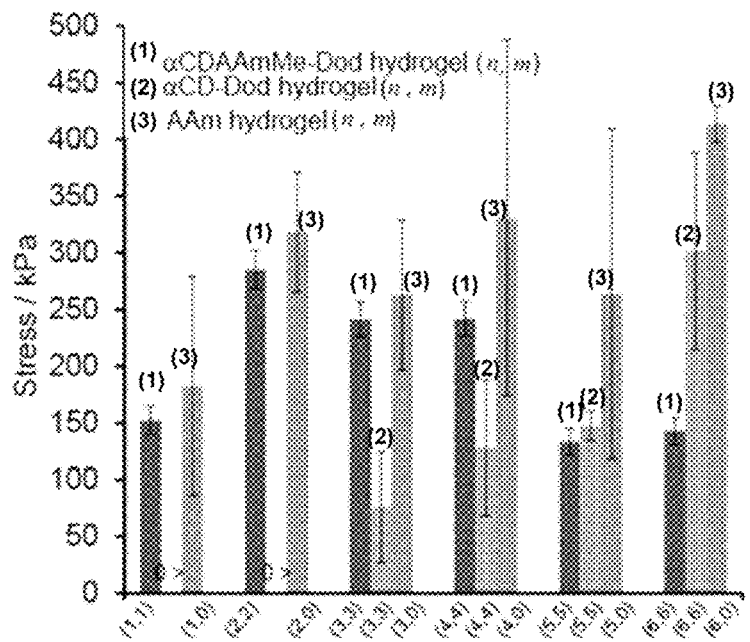
FIG. 9 illustrates the summary of the results of stress characteristics of α-macromolecular gels and AAm gels (acrylamide gels crosslinked with methylenebisacrylamide) of Examples 1 to 6 and Comparative Examples 1 to 4.

FIG. 9 illustrates a summary of the results of stress of the α-CDAAmMe-Dod gel (x,y), α-CDAAm-Dod gel (x,y), and AAm gel (an acrylamide gel crosslinked with methylenebisacrylamide), which is a blank gel.

Figure 10:
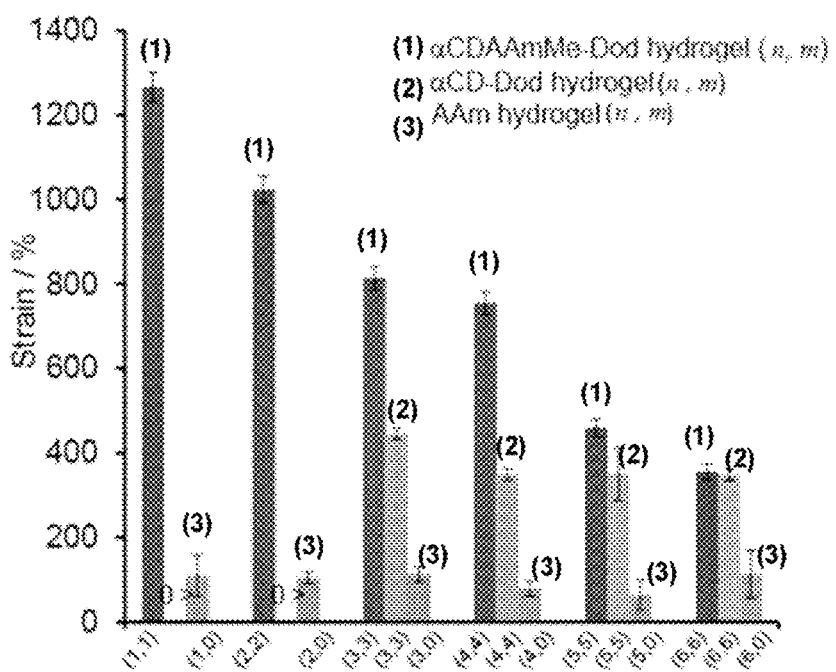
FIG. 10 illustrates the summary of the results of strain characteristics of α-macromolecular gels and AAm gels (acrylamide gels crosslinked with methylenebisacrylamide) of Examples 1 to 6 and Comparative Examples 1 to 4.

FIG. 10 illustrates a summary of the results of strain of the α-CDAAmMe-Dod gel (x,y), α-CDAAm-Dod gel (x,y), and AAm gel (an acrylamide gel crosslinked with methylenebisacrylamide).

The results shown in FIGS. 9 and 10 indicate that the α-CDAAmMe-Dod gels are excellent in both the stress characteristics and strain characteristics, compared with the α-CDAAm-Dod gels. Additionally, the AAm gels, despite their high stress, are inferior to the α-CDAAmMe-Dod gels in strain characteristics.

Figure 11:
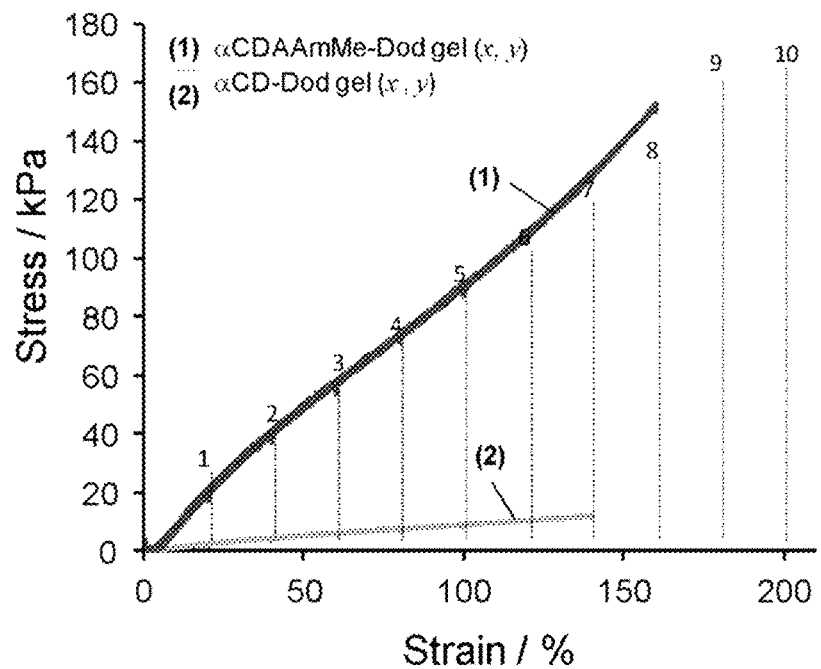
FIG. 11 illustrates the results of a repeated tensile test performed on an α-CDAAmMe-Dod gel (3,3) and an α-CDAAm-Dod gel (3,3).

FIG. 11 illustrates the results of the repeated tensile test performed on the α-CDAAmMe-Dod gel (3,3) and the α-CDAAm-Dod gel (3,3).

The results shown in FIG. 11 indicate that the α-CDAAmMe-Dod gel (3,3) has higher stress than the α-CDAAm-Dod gel (3,3), which means that the α-CDAAmMe-Dod gel (3,3) has high toughness. The α-CDAAmMe-Dod gel (3,3) was also confirmed to leave no marks made by stretching, while maintaining stress-strain. This indicates that the α-CDAAmMe-Dod gel (x,y) has self-healing properties.

Figure 12:
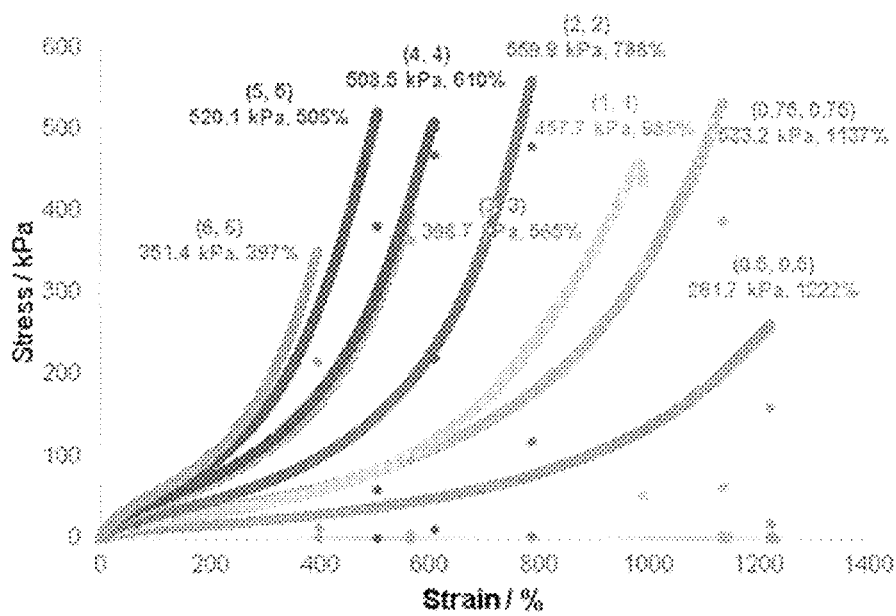
FIG. 12 is a graph illustrating the results of stress-strain of the macromolecular gels of Example 8.

FIG. 12 illustrates the stress-strain curves of α-CDAAmMe-Ad gels (x,y) ((x,y)=(6,6), (5,5), (4,4), (3,3), (2,2), (1,1), (0.75,0.75), and (0.5,0.5)).

Figure 13:
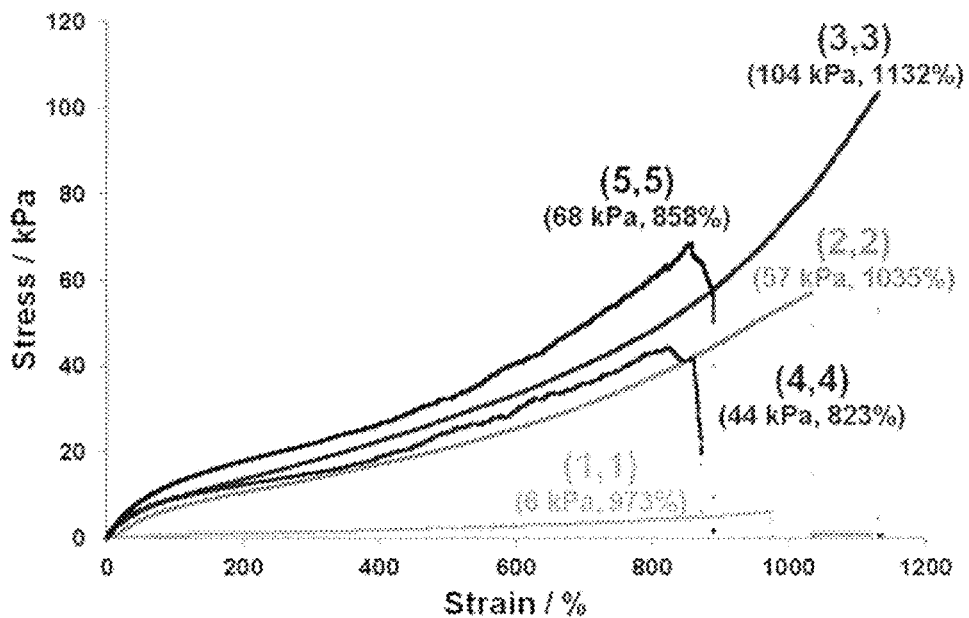
FIG. 13 is a graph illustrating the results of stress-strain of the macromolecular gels of Comparative Example 5.

FIG. 13 illustrates stress-strain curves of β-CDAAm-Ad gels (x,y) that have no linker ((x,y)=(5,5), (4,4), (3,3), (2,2), and (1,1)).

The results shown in FIGS. 12 and 13 indicate that the β-CDAAmMe-Ad gels are excellent in stress characteristics, compared with the β-CDAAm-Ad gels.

Figure 14:
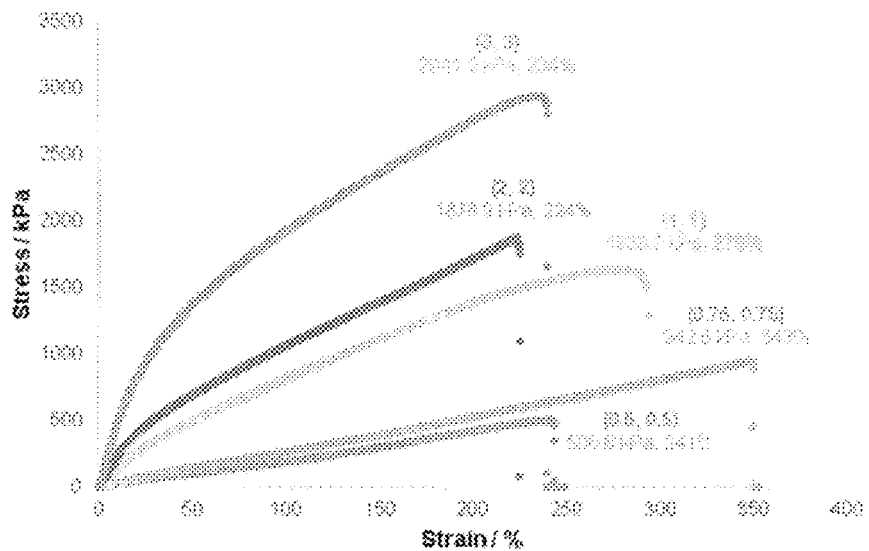
FIG. 14 is a graph illustrating the results of stress-strain of the xerogels of Example 10.

FIG. 14 illustrates stress-strain curves of xerogels prepared from the β-CDAAmMe-Ad gels (x,y) of Example 10 ((x,y)=(3,3), (2,2), (1,1), (0.75,0.75), and (0.5,0.5)). The results shown in FIG. 14 indicate that the xerogels also have excellent stress characteristics.

Figure 15:
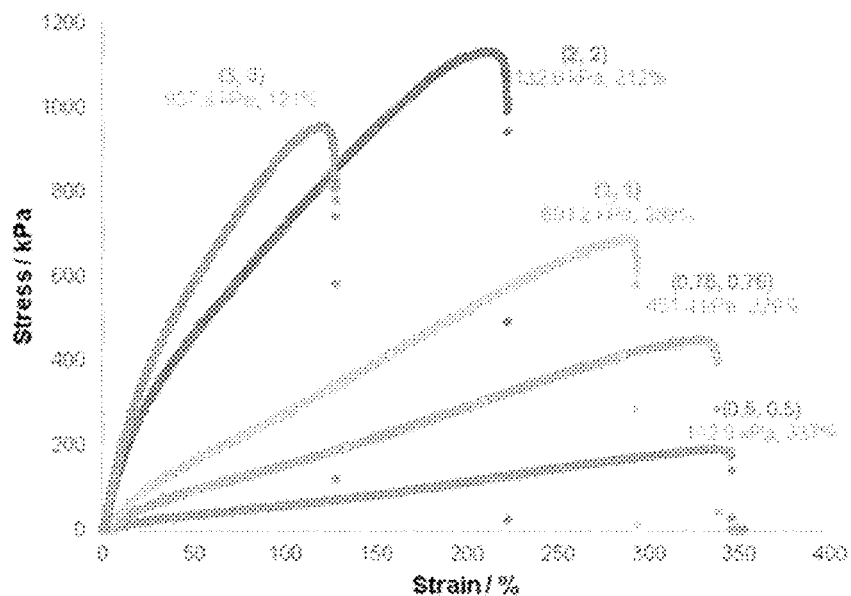
FIG. 15 is a graph illustrating the results of stress-strain of the xerogels of Example 11.

FIG. 15 illustrates stress-strain curves of xerogels prepared from the β-CDAAmMe-Ib gels (x,y) of Example 11 ((x,y)=(3,3), (2,2), (1,1), (0.75,0.75), and (0.5,0.5)). The results shown in FIG. 15 indicate that the xerogels also have excellent stress characteristics.

Figure 16:
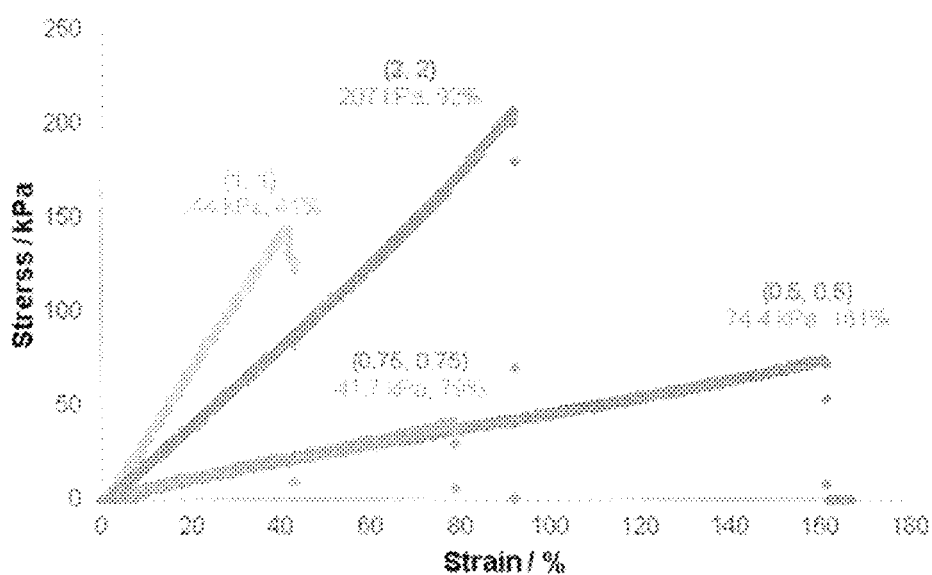
FIG. 16 is a graph illustrating the results of stress-strain curves of the xerogels of acrylamide gels (crosslinked with TEGAA).

FIG. 16 illustrates stress-strain curves of xerogels prepared from acrylamide gels (crosslinked with TEGAA). Compared with the β-CDAAmMe-Ib gels (x,y) of Example 11, these xerogels are inferior in stress and strain. These results also indicate that β-CDAAmMe-Ib gels have high toughness.

Figure 17:
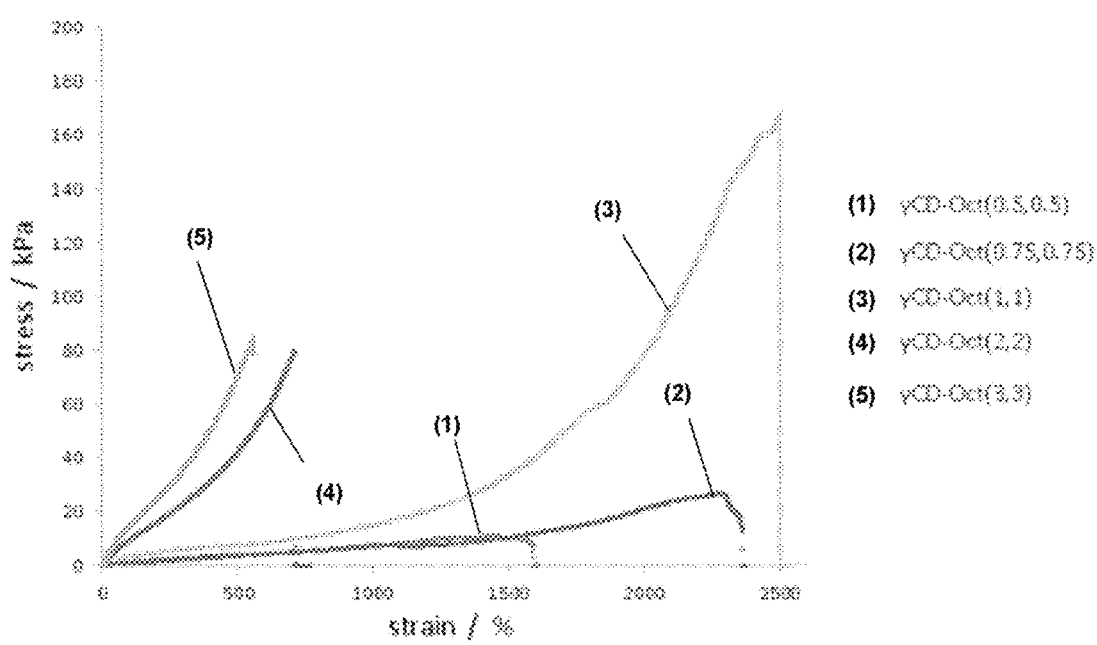
FIG. 17 is a graph illustrating the results of stress-strain of the macromolecular gels of Example 12.

FIG. 17 illustrates stress-strain curves of γ-CDAAmMe-Oct gels (x,y) ((x,y)=(3,3), (2,2), (1,1), (0.75,0.75), and (0.5,0.5)). The results indicate that due to the presence of the linker site, γ-CDAAmMe-Oct gels (x,y) also exhibit a significantly improved strain percentage and, in particular, exhibit excellent stress characteristics when (x,y) is (1,1).

Figure 18:
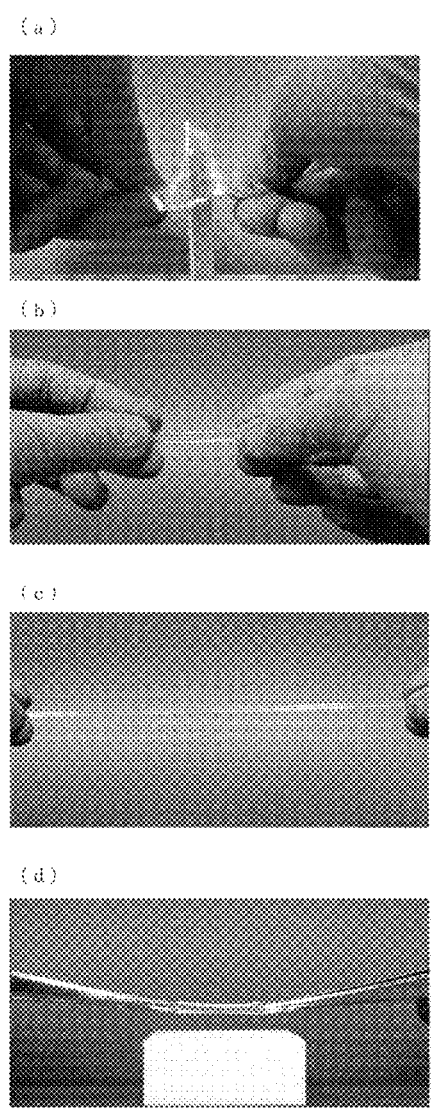
FIG. 18 is photographs illustrating the evaluation of physical properties of the macromolecular gel of Example 7.

FIG. 18 illustrates photographs that show how the physical properties of the macromolecular gel of Example 7 (α-CDAAmMe-Oct gel (1,1)) are evaluated.

The puncture strength test shown in FIG. 18(a) found no rupture in the α-CDAAmMe-Oct gel (1,1), indicating that this macromolecular gel has high toughness.

The tensile test shown in FIGS. 18(b) and 18(c) also found no rupture in the α-CDAAmMe-Oct gel (1,1), and confirmed that the gel recovered the original shape after the test.

The self-healing test shown in FIG. 18(d) confirmed that after the ruptured pieces of the α-CDAAmMe-Oct gel (1,1) were adhered, the gel was restored to its original state, indicating that this macromolecular gel has self-healing properties.

Figure 19:
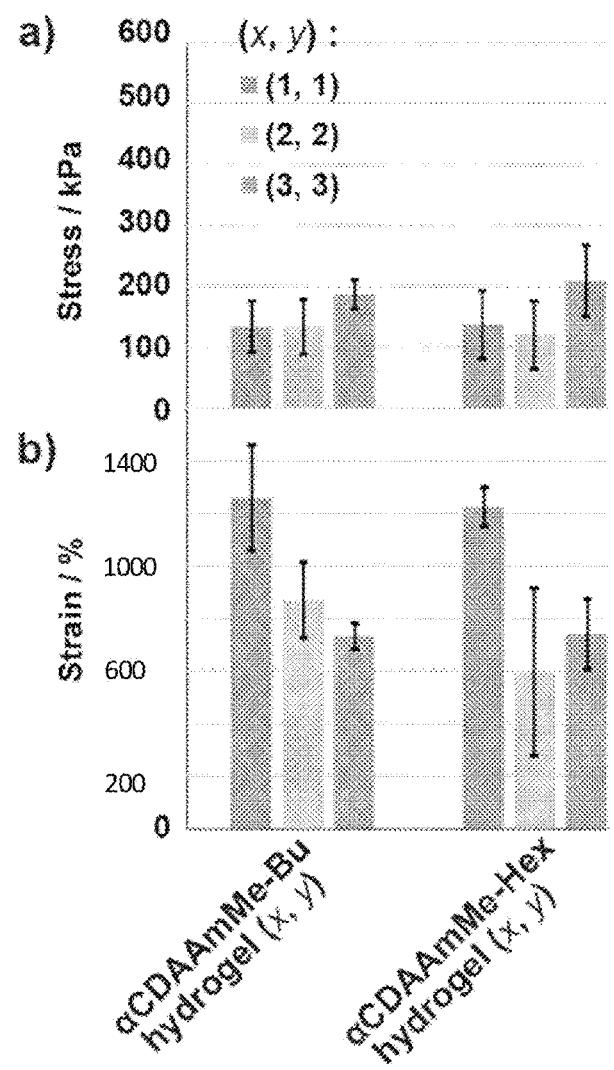
FIG. 19 illustrates the results of the measurement of stress-strain of α-CDAAmMe-Bu gels (x,y) and α-CDAAmMe-Hex gels (x,y).

FIG. 19 illustrates the measurement results of α-CDAAmMe-Bu gels (x,y) and α-CDAAmMe-Hex gels (x,y) (the bars in the graphs show, from the left, samples whose (x, y) is (1,1), (2,2), and (3,3)). All gels were confirmed to have high toughness.

Figure 20:
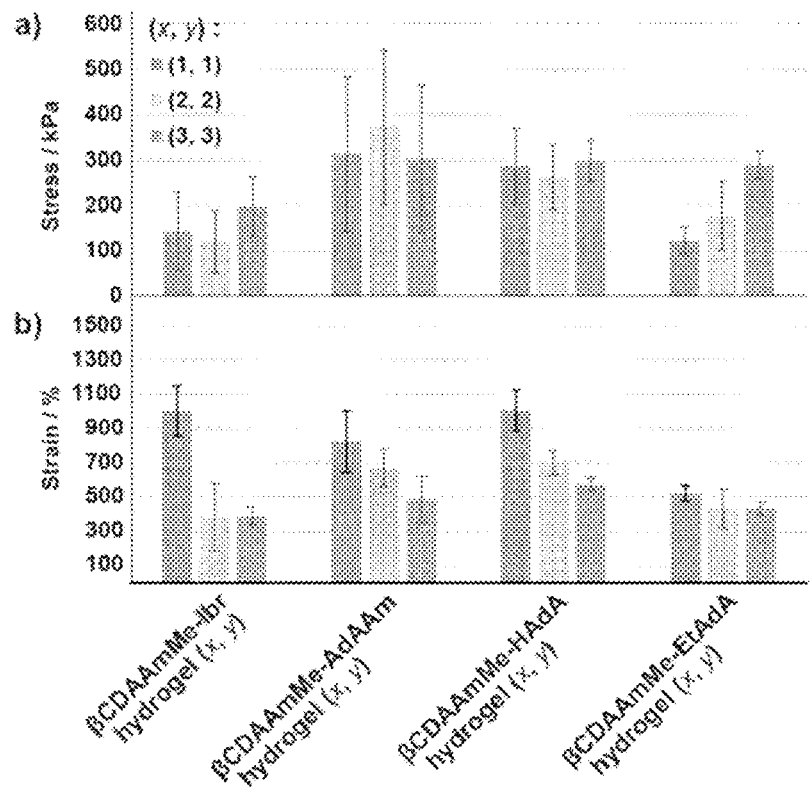
FIG. 20 illustrates the results of the measurement of stress-strain of β-CDAAmMe-Ib gels (x,y), β-CDAAmMe-Ad gels (x,y), β-CDAAmMe-HAdA gels (x,y), and β-CDAAmMe-EtAdA gels (x,y).

FIG. 20 illustrates the measurement results of a α-CDAAmMe-Ib gel (x,y) (indicated as β-CDAAmMe-Ibr in FIG. 20), a β-CDAAmMe-Ad gel (x,y) (indicated as β-CDAAmMe-AdAAm in FIG. 20), a β-CDAAmMe-HAdA gel (x,y), and a β-CDAAmMe-EtAdA gel (x,y)(the bars in the graphs show, from the left, samples whose (x, y) is (1,1), (2,2), and (3,3)). All gels were confirmed to have high toughness.

Figure 21:
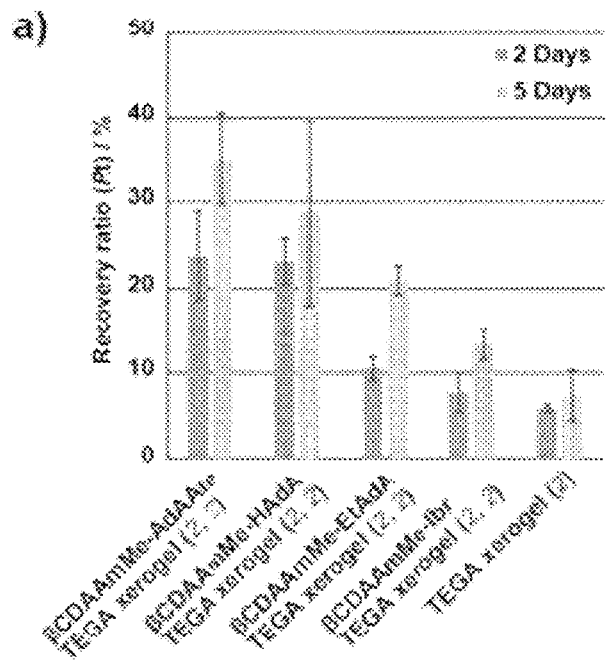
FIG. 21 illustrates the results of the measurement of recovery percentage of the xerogels of Examples 10, 11, 17, and 18.

FIG. 21 illustrates the measurement results of recovery percentage of xerogels prepared in Examples 10, 11, 17, and 18 (T: 2 or 5 days). All xerogels were confirmed to show an excellent recovery percentage.

Figure 22:
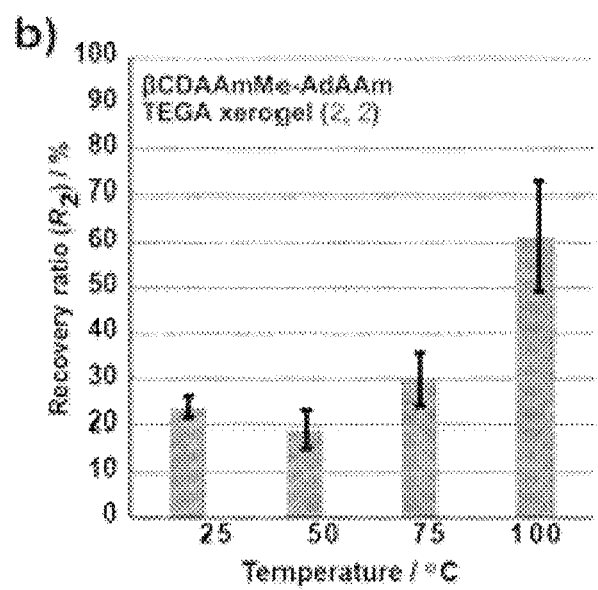
FIG. 22 illustrates the temperature dependency of recovery percentage of a xerogel ((x,y)=(2,2)) obtained in Example 10 (T=2 days).

FIG. 22 illustrates the temperature dependency of the recovery percentage of the xerogel ((x,y)=(2,2)) prepared in Example 10 (T: 2 days). FIG. 22 specifically illustrates a change in recovery percentage that was measured after adhering cleaved pieces of the xerogel, and immediately maintaining the xerogel at predetermined temperatures (25, 50, 75, and 100° C.) for 2 days. The results indicate that the recovery percentage depends on the temperature.

Figure 23:
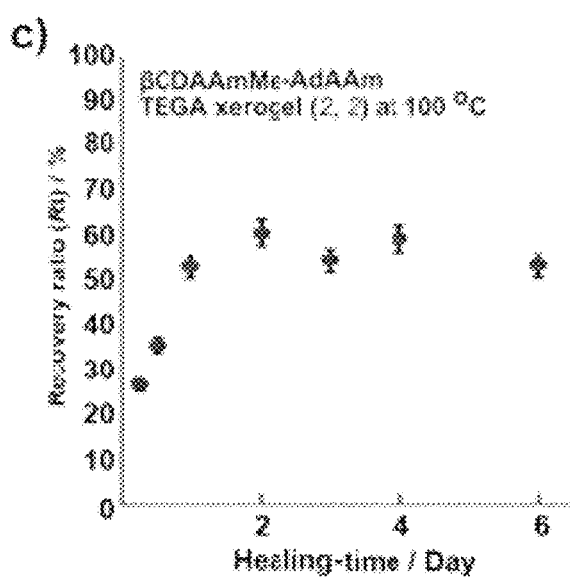
FIG. 23 illustrates a correlation between the recovery time and the recovery percentage of a xerogel obtained in Example 10 ((x,y)=(2,2)) that was cleaved and recovered at 100° C.

FIG. 23 illustrates a correlation between the recovery time and the recovery percentage of the xerogel ((x,y)=(2,2)) prepared in Example 10, which was cleaved and recovered at 100° C. The results indicate that the recovery percentage gradually increases until a certain period of time passes.

The results shown above demonstrate the macromolecular gel containing a crosslinked polymer that contains the repeating structural units represented by formula (1a) and formula (2a) has high toughness and also self-healing properties.

INDUSTRIAL APPLICABILITY

The macromolecular material according to the present invention has high toughness and self-healing properties. Thus, the macromolecular material is expected to have a range of applications, for example, in shock absorbers, tire layers, self-healing coating films, and self-healing adhesives, as a material that has sufficient toughness, ductility, self-healing properties, and durability at practical levels.

The invention claimed is:

1. A macromolecular material comprising a crosslinked polymer that is crosslinked by interaction between a host group and a guest group, the host group being a monovalent group,
the host group being at least one member selected from the group consisting of α-cyclodextrin, β-cyclodextrin, and γ-cyclodextrin,
the crosslinked polymer comprising a repeating structural unit represented by the following formula (1a) and a repeating structural unit represented by the following formula (2a):

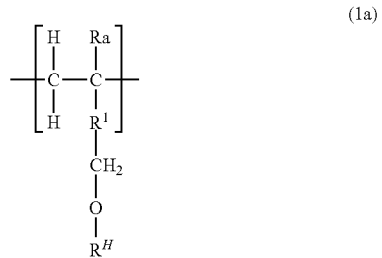
(1a)

wherein Ra represents hydrogen or methyl, $R^H$ represents the host group, and $R^1$ represents a divalent group formed by removing one hydrogen atom from a monovalent group selected from the group consisting of hydroxyl, thiol, alkoxy optionally having at least one substituent, thioalkoxy optionally having at least one substituent, alkyl optionally having at least one substituent, amino optionally having one substituent, amide optionally having one substituent, aldehyde, and carboxyl; and

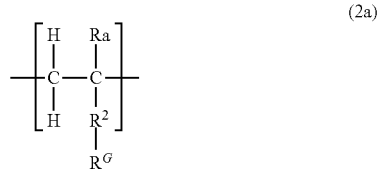
(2a)

wherein Ra represents hydrogen or methyl, $R^G$ represents the guest group, and $R^2$ represents a divalent group formed by removing one hydrogen atom from a monovalent group selected from the group consisting of hydroxyl, thiol, alkoxy optionally having at least one substituent, thioalkoxy optionally having at least one substituent, alkyl optionally having at least one substituent, amino optionally having one substituent, amide optionally having one substituent, aldehyde, and carboxyl.

2. The macromolecular material according to claim 1, wherein the host group is α-cyclodextrin, and the guest group is at least one member selected from the group consisting of octyl and dodecyl.

3. The macromolecular material according to claim 1, wherein the host group is β-cyclodextrin, and the guest group is at least one member selected from the group consisting of adamantyl and isobornyl.

4. The macromolecular material according to claim 1, wherein the host group is γ-cyclodextrin, and the guest group is at least one member selected from the group consisting of octyl and dodecyl.

5. A method for producing a macromolecular material comprising a crosslinked polymer that is crosslinked by interaction between a host group and a guest group, the host group being a monovalent group,
the host group being at least one member selected from the group consisting of α-cyclodextrin, β-cyclodextrin, and γ-cyclodextrin,
the method comprising the step of
subjecting a mixture containing a polymerizable monomer represented by the following formula (1b) and a polymerizable monomer represented by the following formula (2b) to a polymerization reaction to obtain the crosslinked polymer:

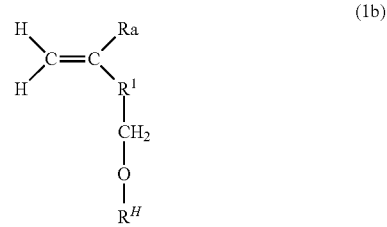
(1b)

wherein Ra represents hydrogen or methyl, and $R^1$ and $R^H$ are respectively as defined for $R^1$ and $R^H$ in formula (1a); and

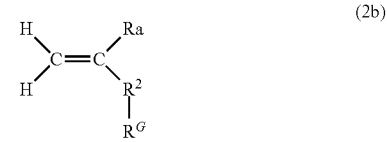
(2b)

wherein Ra represents hydrogen or methyl, and $R^2$ and $R^G$ are respectively as defined for $R^2$ and $R^G$ in formula (2a).

6. The method for producing a macromolecular material according to claim 5, wherein the mixture contains a clathrate compound formed from the polymerizable monomer represented by formula (1b) and the polymerizable monomer represented by formula (2b) by interaction between the host group in formula (1b) and the guest group in formula (2b).

7. The macromolecular material according to claim 1, wherein the guest group is encapsulated in the host group.

* * * * *